(12) United States Patent
Liu et al.

(10) Patent No.: US 10,574,323 B2
(45) Date of Patent: Feb. 25, 2020

(54) DATA TRANSMISSION METHOD AND RELATED DEVICE

(71) Applicant: HUAWEI TECHNOLOGIES CO., LTD., Shenzhen (CN)

(72) Inventors: Kunpeng Liu, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/935,036

(22) Filed: Mar. 25, 2018

(65) Prior Publication Data

US 2018/0212663 A1 Jul. 26, 2018

Related U.S. Application Data

(63) Continuation of application No. PCT/CN2016/100198, filed on Sep. 26, 2016.

(30) Foreign Application Priority Data

Sep. 25, 2015 (CN) .......................... 2015 1 0624685

(51) Int. Cl.
*H04B 7/06* (2006.01)
*H04W 72/04* (2009.01)
(Continued)

(52) U.S. Cl.
CPC ........ *H04B 7/0626* (2013.01); *H04W 72/044* (2013.01); *H04B 7/0417* (2013.01); *H04B 7/0452* (2013.01)

(58) Field of Classification Search
CPC ... H04B 7/0626; H04B 7/0417; H04W 24/10; H04W 72/044
See application file for complete search history.

(56) References Cited

U.S. PATENT DOCUMENTS 8,626,073 B2 * 1/2014 Ruuska .............. H04B 17/0087
370/330
2013/0265959 A1 10/2013 Lee et al.
(Continued)

FOREIGN PATENT DOCUMENTS

CN 102300244 A 12/2011
CN 102368697 A 3/2012
(Continued)

OTHER PUBLICATIONS

R1-154637 Ericsson, "Discussion on CSI Measurement and Reporting for LAA", 3GPP TSG RAN WG1 Meeting #82, Beijing, China, Aug. 24-28, 2015,total 4 pages.
(Continued)

*Primary Examiner* — Shukri Taha
(74) *Attorney, Agent, or Firm* — Kilpatrick Townsend & Stockton LLP

(57) ABSTRACT

Determining, by user equipment, a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and performing, by the user equipment, measurement and feedback according to the determined measurement procedure and/or the determined type of the fed-back CSI. The user equipment can determine different measurement processes and different types of fed-back channel state information CSI according to different types of measurement processes.

8 Claims, 12 Drawing Sheets

(51) Int. Cl.
   *H04B 7/0417* (2017.01)
   *H04B 7/0452* (2017.01)

(56) References Cited

U.S. PATENT DOCUMENTS

| | | | | |
|---|---|---|---|---|
| 2014/0355468 | A1* | 12/2014 | Li | H04W 24/10 370/252 |
| 2015/0124717 | A1* | 5/2015 | Li | H04W 24/10 370/329 |
| 2015/0131563 | A1* | 5/2015 | Guo | H04B 7/0626 370/329 |
| 2015/0162966 | A1 | 6/2015 | Kim et al. | |
| 2015/0222400 | A1 | 8/2015 | Xiong et al. | |
| 2015/0341942 | A1* | 11/2015 | Lee | H04B 7/0626 370/252 |
| 2015/0349867 | A1* | 12/2015 | Guo | H04L 1/0026 370/252 |
| 2018/0234154 | A1* | 8/2018 | Chen | H04B 7/0417 |

FOREIGN PATENT DOCUMENTS

| | | | |
|---|---|---|---|
| CN | 102387528 | A | 3/2012 |
| CN | 103037395 | A | 4/2013 |
| EP | 2852084 | A1 | 3/2015 |
| EP | 2869478 | A1 | 5/2015 |
| JP | 2015513286 | A | 4/2015 |
| JP | 2015531198 | A | 10/2015 |
| KR | 20150035555 | A | 4/2015 |
| WO | 2014020434 | A1 | 2/2014 |

OTHER PUBLICATIONS

"3GPP TS 36.211 V12.7.0 3rd Generation Partnership Project; Technical Specification Group Radio Access Network; Evolved Universal Terrestrial Radio Access (E-UTRA);Physical channels and modulation(Release 12),Technical Specification, Sep. 2015, 136 pages".

"3GPP TS 36.213 V12.7.0 3rd Generation Partnership Project; Technical Specification Group Radio Access Network; Evolved Universal Terrestrial Radio Access (E-UTRA);Physical layer procedures(Release 12), Technical Specification, Sep. 2015, 241 pages".

"3GPP Ts 36.331 V12.7.0 3rd Generation Partnership Project;Technical Specification Group Radio Access Network; Evolved Universal Terrestrial Radio Access (E-UTRA);Radio Resource Control (RRC);Protocol specification(Release 12), Technical Specification, Sep. 2015, 452 pages".

Huawei, HiSilicon, Discussion on CSI reference resource and CQI definition [online], 3GPP TSG-RAN WG1#82b R1-155665, Sep. 26, 2015, 4 pages.

3rd Generation Partnership Project; Technical Specification Group Radio Access Network; Evolved Universal Terrestrial Radio Access (E-UTRA); Physical layer procedures (Release 13), 3GPP TS 36.213 V13.0.1, (Jan. 2016) Jan. 2016, Section 7.2.3,total 3 pages.

* cited by examiner

DATA TRANSMISSION METHOD AND RELATED DEVICE

CROSS-REFERENCE TO RELATED APPLICATIONS

This application is a continuation of International Application No. PCT/CN2016/100198, filed on Sep. 26, 2016, which claims priority to Chinese Patent Application No. 201510624685.1, filed on Sep. 25, 2015, The disclosures of the aforementioned applications are hereby incorporated by reference in their entireties.

TECHNICAL FIELD

The present invention relates to the field of communications technologies, and in particular, to a data transmission method and a related device.

BACKGROUND

Currently, in an LTE full-duplex communications technology FDD system, user equipment receives a reference signal sent by a base station, performs channel estimation, then determines channel state information, and provides a feedback. In a process of measurement by the user equipment, a quantization loss exists. For a TDD (Time Division Duplexing, time division duplexing technology) system, uplink and downlink heterogeneousness exists in a channel. Therefore, a base station measures an uplink signal sent by user equipment, to obtain an uplink channel h, directly transposes h to obtain a downlink channel h', and performs eigenvalue decomposition according to the downlink channel h' to obtain a downlink precoding matrix. Therefore, by comparing FDD with TDD, for a precoding matrix of FDD, the user equipment performs measurement, and feeds back a quantized precoding matrix to the base station. Therefore, a quantization loss exists. Consequently, channel information that is fed back has an error as compared with that of TDD, resulting in lowered performance.

SUMMARY

Embodiments of the present invention provide a data transmission method and a related device that can improve performance.

A first aspect of the embodiments of the present invention provides a data transmission method, including:

determining, by user equipment, a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and performing, by the user equipment, measurement and feedback according to the determined measurement procedure and/or the determined type of the fed-back CSI.

Optionally, the determining, by user equipment, a measurement procedure and a type of fed-back channel state information CSI according to a type of a measurement process includes:

if the signal measurement pilot defined in the measurement process is a first measurement pilot, determining, by the user equipment, that the type of the fed-back CSI is first CSI; or if the signal measurement pilot defined in the measurement process is a second measurement pilot, determining, by the user equipment, that the type of the fed-back CSI is second CSI, where a feedback amount included in the first CSI and a feedback amount included in the second CSI are different.

Optionally, the first measurement pilot is a non-precoded pilot or a precoded pilot, and/or the first measurement pilot is a periodically sent pilot; and the second measurement pilot is a precoded pilot, and/or the second measurement pilot is not sent periodically, and/or the second measurement pilot is triggered by the base station, and/or the second measurement pilot is sent in a subband.

Optionally, the first CSI includes a rank indication RI, a precoding matrix indication PMI, and a channel quality indication CQI, or the first CSI includes an RI and a PMI; and the second CSI includes an RI, a PMI, and a CQI, or the second CSI includes a CQI, or the second CSI includes an index BI that indicates a selected beam, an RI, and a CQI.

Optionally, that different types of measurement processes correspond to different measurement procedures and/or different types of fed-back channel state information CSI includes: one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, that different types of measurement processes correspond to different measurement procedures and/or different types of fed-back channel state information CSI includes:

one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, synthesis is performed according to measurement amounts of K1 interferences of K interferences that are measured according to the K interference measurement pilots, to determine one CQI, where K1 is an integer greater than 1 and less than or equal to K.

Optionally, synthesis is performed according to M1 signals in measurement of M signals that are measured according to the M signal measurement pilots, to determine one CQI, where M1 is an integer greater than 1 and less than or equal to M.

Optionally, the independent configurations of the signaling types of the limitative measurement include that the limitative measurement is configured independently by using higher layer signaling or dynamic signaling, where the dynamic signaling is notified by using UL grant signaling or DL grant signaling.

Optionally, the K interference measurement pilots are all non-zero power pilots or are all zero power pilots, or the K interference measurement pilots include a non-zero power pilot and a zero power pilot.

Optionally, at least one of the K interference measurement pilots is configured in such a way that limitative measurement for performing interference measurement is disabled.

Optionally, pilots of N ports are configured in the measurement process, where pilots of N1 ports are used to measure a signal, and the pilots of all the N ports are used to measure an interference.

Optionally, one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, when the user equipment calculates the CQI, the user equipment determines that a ratio of a signal measurement power of each pilot port to a power of data is X, where X is related to a quantity of frequency division multiplexing subcarriers of the N ports or is fixed.

Optionally, when the user equipment calculates the CQI, the user equipment determines that a ratio of an interference measurement power of each pilot port to a power of an interference of data received by the user equipment is Y, where Y is related to a quantity of frequency division multiplexing subcarriers of the N ports or is fixed.

Optionally, the ratio X of a signal measurement power of each pilot port to a power of data is equal to the ratio Y of an interference measurement power of each pilot port to a power of an interference of data received by the user equipment.

Optionally, a time-frequency resource location of the second measurement pilot is in a first slot of a subframe.

Optionally, the user equipment feeds back the second CSI in a second slot of the subframe at which the second measurement pilot is located.

Optionally, configuration signaling and the second measurement pilot are in a same slot, the configuration signaling is used to configure the second measurement pilot, and a symbol at which the configuration signaling is located precedes a symbol used to send the second measurement pilot.

Optionally, configuration signaling and the second measurement pilot are in a same slot, the configuration signaling is used to configure the second measurement pilot, and a symbol at which the configuration signaling is located precedes a symbol used to send the second measurement pilot.

Optionally, trigger signaling and the second measurement pilot are in a same slot, the trigger signaling is used to instruct the user equipment to feed back CSI, the trigger signaling and the second measurement pilot are in a same slot, and a symbol at which the trigger signaling is located precedes a symbol used to send the second measurement pilot.

Optionally, trigger signaling and the second measurement pilot are in a same slot, the trigger signaling is used to instruct the user equipment to feed back CSI, the trigger signaling and the second measurement pilot are in a same slot, and a symbol at which the trigger signaling is located precedes a symbol used to send the second measurement pilot.

Optionally, the configuration signaling used to configure the second measurement pilot and the trigger signaling used to instruct the user equipment to feed back CSI are in same DCI.

Optionally, the method further includes: receiving, by the user equipment, dynamic signaling sent by the base station, where the dynamic signaling indicates at least two of the following:

a type set of CSI feedbacks, a frequency domain granularity of CSI, a feedback moment used to feed back the type set of CSI feedbacks, or an uplink channel type of a CSI feedback; and the type set of CSI feedbacks includes at least two CSI feedback types of the following: an RI, a PMI, a CQI interference power, an interference covariance matrix, a channel covariance matrix, a channel covariance matrix, a CQI, beam selection information, a factor for synthesis of beams, indication information used to instruct the user equipment to perform explicit feedback, or indication information used to instruct the user equipment to perform implicit feedback.

Optionally, the user equipment determines a target CSI feedback type according to the dynamic signaling, where the target CSI feedback type is any one of the at least two CSI feedback types included in the type set of CSI feedbacks, and the user equipment further determines, according to the dynamic signaling, a feedback moment used to feed back any one of the at least two target CSI feedback types.

Optionally, the method further includes: determining, by the user equipment according to the dynamic signaling, that the feedback moment used to feed back any one of the target CSI feedback types is a target feedback moment, where the target feedback moment includes at least two different moments.

Optionally, the method further includes: determining, by the user equipment according to the dynamic signaling, at least one piece of reference signal configuration information; and determining, by the user equipment, at least one reference signal according to the at least one piece of reference signal configuration information, where the at least one piece of reference signal configuration information is used to configure the at least one reference signal, where any one of the at least one reference signal corresponds to at least one CSI feedback type included in the type set of CSI feedbacks.

Optionally, the method further includes: determining, by the user equipment, at least one piece of feedback channel configuration information according to the dynamic signaling; and determining, by the user equipment, at least one feedback channel according to the at least one piece of feedback channel configuration information, where the at least one piece of feedback channel configuration information is used to configure the at least one feedback channel, where any one of the at least one feedback channel corresponds to at least one CSI feedback type included in the type set of CSI feedbacks.

Optionally, a time interval from a reference resource of the second CSI that is obtained by measurement by the user equipment according to the second measurement pilot to a reporting moment is X1, and a time interval from a reference resource of the first CSI that is obtained by measurement according to the first measurement pilot to a reporting moment is X2, where X1<X2, and the reference resource is a subframe used to send the second measurement pilot.

Optionally, a time interval from a reference resource of the second CSI that is obtained by measurement by the user equipment according to the second measurement pilot to a reporting moment is X1, where X1 is configured by using higher layer signaling or is configured by using dynamic signaling, and the reference resource is a subframe used to send the second measurement pilot.

Optionally, a time interval from a reference resource of measurement by the user equipment according to the second measurement pilot to a reporting moment is X1, where X1 is related to a quantity of resources of the second measurement pilot that are included in one measurement process and/or a quantity of ports included in each second measurement pilot, and the reference resource is a subframe used to send the second measurement pilot.

A second aspect of the embodiments of the present invention provides a data transmission method, including:

indicating, by a base station, a type of a measurement process to user equipment, where the type of the measurement process is used to enable the user equipment to determine, according to the type of the measurement process, a measurement procedure and a type of fed-back channel state information CSI, the type of the measurement process includes a definition of a signal measurement pilot and a definition of an interference measurement pilot, and different types of measurement processes correspond to different measurement procedures and/or different types of fed-back channel state information CSI; and receiving, by the base station, a feedback sent by the user equipment, where the feedback is generated by the user equipment according to the determined measurement process and/or fed-back CSI.

Optionally, if the signal measurement pilot defined in the measurement process is a first measurement pilot, a type of CSI that is sent by the user equipment and that is received by the base station is first CSI; or if the signal measurement pilot defined in the measurement process is a second measurement pilot, a type of CSI that is sent by the user equipment and that is received by the base station is second CSI, where a feedback amount included in the first CSI and a feedback amount included in the second CSI are different.

Optionally, the first measurement pilot is a non-precoded pilot or a precoded pilot, and/or the first measurement pilot is a periodically sent pilot; and the second measurement pilot is a precoded pilot, and/or the second measurement pilot is not sent periodically, and/or the second measurement pilot is triggered by the base station, and/or the second measurement pilot is sent in a subband.

Optionally, the first CSI includes a rank indication RI, a precoding matrix indication PMI, and a channel quality indication CQI, or the first CSI includes an RI and a PMI; and the second CSI includes an RI, a PMI, and a CQI, or the second CSI includes a CQI, or the second CSI includes an index BI that indicates a selected beam, an RI, and a CQI.

Optionally, that different types of measurement processes correspond to different measurement procedures and/or different types of fed-back channel state information CSI includes:

one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, that different types of measurement processes correspond to different measurement procedures and/or different types of fed-back channel state information CSI includes:

one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the base station receives a CQI sent by the user equipment, where the CQI is one CQI determined by the user equipment by performing synthesis according to measurement amounts of K1 interferences of K interferences that are measured according to the K interference measurement pilots, where K1 is an integer greater than 1 and less than or equal to K.

Optionally, the base station receives a CQI sent by the user equipment, where the CQI is one CQI determined by the user equipment by performing synthesis according to M1 signals in measurement of M signals that are measured according to the M signal measurement pilots, where M1 is an integer greater than 1 and less than or equal to M.

Optionally, the independent configurations of the signaling types of the limitative measurement include that the limitative measurement is configured independently by using higher layer signaling or dynamic signaling, where the dynamic signaling is notified by using UL grant signaling or DL grant signaling.

Optionally, the K interference measurement pilots are all non-zero power pilots or are all zero power pilots, or the K interference measurement pilots include a non-zero power pilot and a zero power pilot.

Optionally, at least one of the K interference measurement pilots is configured in such a way that limitative measurement for performing interference measurement is disabled.

Optionally, pilots of N ports are configured in the measurement process, where pilots of N1 ports are used to measure a signal, and the pilots of all the N ports are used to measure an interference.

Optionally, one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, a ratio X of a signal measurement power of each pilot port to a power of data is equal to a ratio Y of an interference measurement power of each pilot port to a power of an interference of data received by the user equipment.

Optionally, a time-frequency resource location of the second measurement pilot is in a first slot of a subframe.

Optionally, the base station receives, in a second slot of the subframe at which the second measurement pilot is located, a feedback of the second CSI sent by the user equipment.

Optionally, the base station determines a time interval X1, where X1 is a time interval from a reference resource of the second CSI that is obtained by measurement by the user equipment according to the second measurement pilot to a reporting moment; and the base station determines a time interval X2, where X2 is a time interval from a reference resource of the first CSI that is obtained by measurement by the user equipment according to the first measurement pilot to a reporting moment, where X1<X2, and the reference resource is a subframe used to send the second measurement pilot.

Optionally, the base station determines a time interval X1, where X1 is a time interval from a reference resource of the second CSI that is obtained by measurement by the user equipment according to the second measurement pilot to a reporting moment, where X1 is configured by using higher layer signaling or is configured by using dynamic signaling, and the reference resource is a subframe used to send the second measurement pilot.

Optionally, the base station determines a time interval X1, where X1 is a time interval from a reference resource of the second CSI that is obtained by measurement by the user equipment according to the second measurement pilot to a reporting moment, where X1 is related to a quantity of resources of the second measurement pilot that are included in one measurement process and/or a quantity of ports included in each second measurement pilot, and the reference resource is a subframe used to send the second measurement pilot.

Optionally, configuration signaling and the second measurement pilot are in a same slot, the configuration signaling is used to configure the second measurement pilot, and a symbol at which the configuration signaling is located precedes a symbol used to send the second measurement pilot.

Optionally, configuration signaling and the second measurement pilot are in a same slot, the configuration signaling is used to configure the second measurement pilot, and a symbol at which the configuration signaling is located precedes a symbol used to send the second measurement pilot.

Optionally, trigger signaling and the second measurement pilot are in a same slot, the trigger signaling is used to instruct the user equipment to feed back CSI, the trigger signaling and the second measurement pilot are in a same slot, and a symbol at which the trigger signaling is located precedes a symbol used to send the second measurement pilot.

Optionally, trigger signaling and the second measurement pilot are in a same slot, the trigger signaling is used to instruct the user equipment to feed back CSI, the trigger signaling and the second measurement pilot are in a same slot, and a symbol at which the trigger signaling is located precedes a symbol used to send the second measurement pilot.

Optionally, the configuration signaling used to configure the second measurement pilot and the trigger signaling used to instruct the user equipment to feed back CSI are in same DCI.

Optionally, the method further includes: sending, by the base station, dynamic signaling to the user equipment, where the dynamic signaling indicates at least two of the following: a type set of CSI feedbacks, a frequency domain granularity of CSI, a feedback moment used to feed back a frequency domain granularity of the type set of CSI feedbacks, or an uplink channel type of a CSI feedback; and the type set of CSI feedbacks includes at least two CSI feedback types of the following: an RI, a PMI, a CQI interference power, an interference covariance matrix, a channel covariance matrix, a channel covariance matrix, a CQI, beam selection information, a factor for synthesis of beams, indication information used to instruct the user equipment to perform explicit feedback, or indication information used to instruct the user equipment to perform implicit feedback.

Optionally, the dynamic signaling is used to instruct the user equipment to determine a target CSI feedback type, where the target CSI feedback type is any one of the at least two CSI feedback types included in the type set of CSI feedbacks, and the dynamic signaling is used to instruct the user equipment to determine a feedback moment used to feed back any one of the at least two target CSI feedback types.

Optionally, the method further includes: the dynamic signaling is used to instruct the user equipment to determine that the feedback moment used to feed back any one of the target CSI feedback types is a target feedback moment, and the target feedback moment includes at least two different moments.

Optionally, the method further includes: the dynamic signaling is used to instruct the user equipment to determine at least one piece of reference signal configuration information; and the user equipment determines at least one reference signal according to the at least one piece of reference signal configuration information, where the at least one piece of reference signal configuration information is used to configure the at least one reference signal, where any one of the at least one reference signal corresponds to at least one CSI feedback type included in the type set of CSI feedbacks.

Optionally, the method further includes: the dynamic signaling is used to instruct the user equipment to determine at least one piece of feedback channel configuration information; and the user equipment determines at least one feedback channel according to the at least one piece of feedback channel configuration information, where the at least one piece of feedback channel configuration information is used to configure the at least one feedback channel, where any one of the at least one feedback channel corresponds to at least one CSI feedback type included in the type set of CSI feedbacks.

A third aspect of the embodiments of the present invention provides user equipment, including:

a determining unit, configured to determine a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and a feedback unit, configured to perform measurement and feedback according to the determined measurement procedure and/or the determined type of the fed-back CSI.

Optionally, the determining unit includes:

a first determining module, configured to: if the signal measurement pilot defined in the measurement process is a first measurement pilot, determine that the type of the fed-back CSI is first CSI; or a second determining module, configured to: if the signal measurement pilot defined in the measurement process is a second measurement pilot, determine that the type of the fed-back CSI is second CSI, where a feedback amount included in the first CSI and a feedback amount included in the second CSI are different.

Optionally, the first measurement pilot determined by the first determining module is a non-precoded pilot or a precoded pilot, and/or the first measurement pilot is a periodically sent pilot; and the second measurement pilot determined by the second determining module is a precoded pilot, and/or the second measurement pilot is not sent periodically, and/or the second measurement pilot is triggered by the base station, and/or the second measurement pilot is sent in a subband.

Optionally, the first CSI determined by the first determining module includes a rank indication RI, a precoding matrix indication PMI, and a channel quality indication CQI, or the first CSI includes an RI and a PMI; and the second CSI determined by the second determining module includes an RI, a PMI, and a CQI, or the second CSI includes a CQI, or the second CSI includes an index BI that indicates a selected beam, an RI, and a CQI.

Optionally, the determining unit is further configured to determine that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the determining unit is further configured to determine that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the determining unit is further configured to determine that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the user equipment further includes a third determining module, configured to perform synthesis according to measurement amounts of K1 interferences of K interferences that are measured according to the K interference measurement pilots, to determine one CQI, where K1 is an integer greater than 1 and less than or equal to K.

Optionally, the user equipment further includes a fourth determining module, configured to perform synthesis according to M1 signals in measurement of M signals that are measured according to the M signal measurement pilots, to determine one CQI, where M1 is an integer greater than 1 and less than or equal to M.

Optionally, the determining unit determines that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the determining unit is further configured to determine that the K interference measurement pilots are all non-zero power pilots or are all zero power pilots, or the K interference measurement pilots include a non-zero power pilot and a zero power pilot.

Optionally, the determining unit is further configured to determine that at least one of the K interference measurement pilots is configured in such a way that limitative measurement for performing interference measurement is disabled.

Optionally, the determining unit is further configured to determine that pilots of N ports are configured in the measurement process, where pilots of N1 ports are used to measure a signal, and the pilots of all the N ports are used to measure an interference.

Optionally, the determining unit is further configured to determine that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the determining unit is further configured to determine that one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, when determining to calculate the CQI, the user equipment determines that a ratio of a signal measurement power of each pilot port to a power of data is X, where X is related to a quantity of frequency division multiplexing subcarriers of the N ports or is fixed.

Optionally, when determining to calculate the CQI, the user equipment determines that a ratio of an interference measurement power of each pilot port to a power of an interference of data received by the user equipment is Y, where Y is related to a quantity of frequency division multiplexing subcarriers of the N ports or is fixed.

Optionally, it is determined that the ratio X of a signal measurement power of each pilot port to a power of data is equal to the ratio Y of an interference measurement power of each pilot port to a power of an interference of data received by the user equipment.

Optionally, the determining unit is further configured to determine that a time-frequency resource location of the second measurement pilot is in a first slot of a subframe.

Optionally, the user equipment further includes a sending unit, where the sending unit is configured to feed back the second CSI in a second slot of the subframe at which the second measurement pilot is located.

Optionally, the determining unit is further configured to determine that a time interval from a reference resource of the second CSI that is obtained by measurement according to the second measurement pilot to a reporting moment is X1, and a time interval from a reference resource of the first CSI that is obtained by measurement according to the first measurement pilot to a reporting moment is X2, where X1<X2, and the reference resource is a subframe used to send the second measurement pilot.

Optionally, the determining unit is further configured to determine that a time interval from a reference resource of the second CSI that is obtained by measurement according to the second measurement pilot to a reporting moment is X1, where X1 is configured by using higher layer signaling or is configured by using dynamic signaling, and the reference resource is a subframe used to send the second measurement pilot.

Optionally, the determining unit is further configured to determine that a time interval from a reference resource of measurement according to the second measurement pilot to a reporting moment is X1, where X1 is related to a quantity of resources of the second measurement pilot that are included in one measurement process and/or a quantity of ports included in each second measurement pilot, and the reference resource is a subframe used to send the second measurement pilot.

A fourth aspect of the embodiments of the present invention provides a base station, including:

an indication unit, configured to indicate a type of a measurement process to user equipment, where the type of the measurement process is used to enable the user equipment to determine, according to the type of the measurement process, a measurement procedure and a type of fed-back channel state information CSI, the type of the measurement process includes a definition of a signal measurement pilot and a definition of an interference measurement pilot, and different types of measurement processes correspond to different measurement procedures and/or different types of fed-back channel state information CSI; and a receiving unit, configured to receive a feedback sent by the user equipment, where the feedback is generated by the user equipment according to the determined measurement procedure and/or fed-back CSI.

Optionally, the receiving unit includes:

a first receiving module, configured to: if the signal measurement pilot defined in the measurement process is a first measurement pilot, receive CSI that is sent by the user equipment and whose type is first CSI; or a second receiving module, configured to: if the signal measurement pilot defined in the measurement process is a second measurement pilot, receive CSI that is sent by the user equipment and whose type is second CSI, where a feedback amount included in the first CSI and a feedback amount included in the second CSI are different.

Optionally, the indication unit is further configured to indicate that the first measurement pilot is a non-precoded pilot or a precoded pilot, and/or the first measurement pilot is a periodically sent pilot; and the second measurement pilot is a precoded pilot, and/or the second measurement pilot is not sent periodically, and/or the second measurement pilot is triggered by the base station, and/or the second measurement pilot is sent in a subband.

Optionally, the first CSI received by the receiving unit includes a rank indication RI, a precoding matrix indication PMI, and a channel quality indication CQI, or the first CSI includes an RI and a PMI; and the second CSI received by the receiving unit includes an RI, a PMI, and a CQI, or the second CSI includes a CQI, or the second CSI includes an index BI that indicates a selected beam, an RI, and a CQI.

Optionally, the indication unit is further configured to indicate that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the indication unit is further configured to indicate that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the indication unit is further configured to indicate that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the receiving unit is further configured to receive a CQI sent by the user equipment, where the CQI is one CQI determined by the user equipment by performing synthesis according to measurement amounts of K1 interferences of K interferences that are measured according to the K interference measurement pilots, where K1 is an integer greater than 1 and less than or equal to K.

Optionally, the receiving unit is further configured to receive a CQI sent by the user equipment, where the CQI is one CQI determined by the user equipment by performing synthesis according to M1 signals in measurement of M signals that are measured according to the M signal measurement pilots, where M1 is an integer greater than 1 and less than or equal to M.

Optionally, the indication unit is further configured to indicate that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the indication unit is further configured to indicate that the K interference measurement pilots are all non-zero power pilots or are all zero power pilots, or the K interference measurement pilots include a non-zero power pilot and a zero power pilot.

Optionally, the indication unit is further configured to indicate that at least one of the K interference measurement pilots is configured in such a way that limitative measurement for performing interference measurement is disabled.

Optionally, the indication unit is further configured to indicate that pilots of N ports are configured in the measurement process, where pilots of N1 ports are used to measure a signal, and the pilots of all the N ports are used to measure an interference.

Optionally, the indication unit is further configured to indicate that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the indication unit is further configured to indicate that one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, the indication unit is further configured to indicate that a ratio X of a signal measurement power of each pilot port to a power of data is equal to a ratio Y of an interference measurement power of each pilot port to a power of an interference of data received by the user equipment.

Optionally, the indication unit is further configured to indicate that a time-frequency resource location of the second measurement pilot is in a first slot of a subframe.

Optionally, the receiving unit is further configured to receive, in a second slot of the subframe at which the second measurement pilot is located, a feedback of the second CSI sent by the user equipment.

Optionally, the indication unit is further configured to: determine a time interval X1, where X1 is a time interval from a reference resource of the second CSI that is obtained by measurement by the user equipment according to the second measurement pilot to a reporting moment; and determine a time interval X2, where X2 is a time interval from a reference resource of the first CSI that is obtained by measurement by the user equipment according to the first measurement pilot to a reporting moment, where X1<X2, and the reference resource is a subframe used to send the second measurement pilot.

Optionally, the indication unit is further configured to determine a time interval X1, where X1 is a time interval from a reference resource of the second CSI that is obtained by measurement by the user equipment according to the second measurement pilot to a reporting moment, where X1 is configured by using higher layer signaling or is configured by using dynamic signaling, and the reference resource is a subframe used to send the second measurement pilot.

Optionally, the indication unit is further configured to determine a time interval X1, where X1 is a time interval from a reference resource of the second CSI that is obtained by measurement by the user equipment according to the second measurement pilot to a reporting moment, where X1 is related to a quantity of resources of the second measurement pilot that are included in one measurement process and/or a quantity of ports included in each second measurement pilot, and the reference resource is a subframe used to send the second measurement pilot.

A fifth aspect of the embodiments of the present invention provides a data transmission method, including:

performing, by user equipment, channel information measurement according to N1 reference signal resources in a set that includes N reference signal resources, to obtain channel information, where N is a positive integer greater than or equal to 2, and N1 is a positive integer less than or equal to N;

performing, by the user equipment, interference information measurement according to N2 reference signal resources in the set that includes the N reference signal resources, to obtain interference information, where N2 is a positive integer less than or equal to N;

determining, by the user equipment, channel state information CSI according to the channel information and the interference information; and sending, by the user equipment, the determined channel state information CSI to a base station.

Optionally, the N1 reference signal resources in the set that includes the N reference signal resources and the N2 reference signal resources in the set that includes the N reference signal resources have an overlapping resource, the N1 reference signal resources are used to perform channel information measurement, and the N2 reference signal resources are used to perform interference information measurement.

Optionally, the N2 reference signal resources in the set that includes the N reference signal resources include N21 reference signal resources configured to have a non-zero power and/or N22 reference signal resources configured to have a zero power, where N21 is less than or equal to N, and N22 is less than or equal to N.

Optionally, the user equipment performs dynamic switching among a first interference measurement resource, a second interference measurement resource, and a third interference measurement resource, where the first interference measurement resource is exclusively a non-zero power reference signal resource, a quantity of the non-zero power reference signal resources is N21, and N21 is equal to N; the second interference measurement resource is exclusively a zero power reference signal resource, where a quantity of the zero power reference signal resources is N22, and N22 is equal to N; and the third interference measurement resource includes a non-zero power reference signal resource and a zero power reference signal resource, where a quantity of the non-zero power reference signal resources is N21, N21 is less than N, a quantity of the zero power reference signal resources is N22, and N22 is less than N.

Optionally, the N21 reference signal resources that are included in the N2 reference signal resources and that are configured to have a non-zero power are the same as the N1 reference signal resources in the set that includes the N reference signal resources.

Optionally, before the performing, by user equipment, channel measurement according to N1 reference signal resources in a set that includes N reference signal resources, the method further includes:

receiving, by the user equipment, higher layer signaling that is sent by the base station and that is used to indicate configuration information of the N1 reference signal resources in the set that includes the N reference signal resources, or receiving, by the user equipment, dynamic signaling that is sent by the base station and that is used to indicate configuration information of the N1 reference signal resources in the set that includes the N reference signal resources, where the configuration information includes location information of time-frequency resources of the N1 reference signal resources in the set of the N reference signal resources; and the configuration information further includes at least one of the following:

power information of the N1 reference signal resources in the set of the N reference signal resources, or code resource information of the N1 reference signal resources in the set of the N reference signal resources.

Optionally, X1 ports are multiplexed for the N1 reference signal resources in the set that includes the N reference signal resources;

before the performing, by user equipment, channel measurement according to N1 reference signal resources in a set that includes N reference signal resources, the method includes:

receiving, by the user equipment, configuration information sent by the base station, where the configuration information is used to indicate that M1 ports of the X1 ports are configured to send a first reference signal used to perform channel measurement, where the first reference signal is a non-zero power reference signal, and M1 is less than or equal to X1; and the performing, by user equipment, channel measurement according to N1 reference signal resources in a set that includes N reference signal resources includes:

receiving, by the user equipment, the first reference signal by using the M1 ports of the X1 ports; and performing, by the user equipment, channel measurement according to the first reference signal that is obtained by using the M1 ports of the X1 ports.

Optionally, the configuration information includes first indication information and second indication information, the first indication information is information that is obtained by the user equipment by using higher layer signaling, the first indication information is used to indicate the X1 ports multiplexed for the N1 reference signal resources in the set of the N reference signal resources, the second indication information is information obtained by the user equipment by using dynamic signaling, and the second indication information is used to indicate the M1 ports of the X1 ports multiplexed for the N1 reference signal resources in the set of the N reference signal resources.

Optionally, the multiplexing of the X1 ports for the N1 reference signal resources in the set that includes the N reference signal resources is code division multiplexing; or the multiplexing of the X1 ports for the N1 reference signal resources in the set that includes the N reference signal resources is time-frequency multiplexing and code division multiplexing.

Optionally, before the performing, by the user equipment, interference measurement according to N2 reference signal resources in the set that includes the N reference signal resources, the method further includes:

receiving, by the user equipment, higher layer signaling that is sent by the base station and that is used to indicate configuration information of the N2 reference signal resources in the set that includes the N reference signal resources, or receiving, by the user equipment, dynamic signaling that is sent by the base station and that is used to indicate configuration information of the N2 reference signal resources in the set that includes the N reference signal resources, where the configuration information includes location information of time-frequency resources of the N2 reference signal resources; and the configuration information further includes at least one of the following:

power information of the N2 reference signal resources, or code resource information of the N2 reference signal resources.

Optionally, the method further includes:

determining, by the user equipment, configuration information of the set that includes the N reference signal resources according to prestored indication information, where the indication information is agreed upon in advance by the base station and the user equipment, and the indication information is used to indicate the configuration information of the set that includes the N reference signal resources; or receiving, by the user equipment, higher layer signaling that is sent by the base station and that is used to indicate a configuration of the set that includes the N reference signal resources; or receiving, by the user equipment, dynamic signaling that is sent by the base station and that is used to indicate a configuration and information of the set that includes the N reference signal resources.

Optionally, the method further includes:

the configuration information includes third indication information and fourth indication information, and the third indication information is information that is obtained by the user equipment by using higher layer signaling;

the third indication information includes location information of time-frequency resources of the set of the N reference signal resources;

the third indication information further includes at least one of the following:

power information of the set of the N reference signal resources, or code resource information of the set of the N reference signal resources; and the fourth indication information is used to indicate a target port in a range of the time-frequency resources that are of the set of the N reference signal resources and that are indicated by the third indication information, where the target port is the M1 ports of the X1 ports multiplexed for the N1 reference signal resources in the set of the N reference signal resources.

Optionally, before the performing, by the user equipment, interference measurement according to N2 reference signal resources in the set that includes the N reference signal resources, the method further includes:

determining, by the user equipment according to the location information of the time-frequency resources of the set that includes the N reference signal resources and the location information of the time-frequency resources of the N1 reference signal resources in the set that includes the N reference signal resources, locations of time-frequency resources of the N2 reference signal resources in the set that includes the N reference signal resources.

Optionally, the X1 ports are multiplexed for the N1 reference signal resources in the set that includes the N reference signal resources, and the M1 ports of the X1 ports are configured to send the non-zero power reference signal used to perform channel measurement, where M1 is less than or equal to X1; and before the performing, by the user equipment, interference measurement according to N2 reference signal resources in the set that includes the N reference signal resources, the method further includes:

determining, by the user equipment according to the locations of time-frequency resources of the set that includes the N reference signal resources and the M1 ports of the X1 ports, locations of time-frequency resources of the N2 reference signal resources in the set that includes the N reference signal resources.

Optionally, the performing, by the user equipment, interference measurement according to N2 reference signal resources in the set that includes the N reference signal resources includes:

performing, by the user equipment, interference measurement by using N2 reference signals in the set that includes the N reference signal resources, where the N2 reference signal resources in the set that includes the N reference signal resources include a first reference signal resource and a second reference signal resource, the first reference signal resource is non-zero power reference signal resources corresponding to the M1 ports of the X1 ports of the user equipment, and the second reference signal resource is a zero power reference signal assumed by the user equipment, where the second reference signal resource is a corresponding time-frequency resource, other than the non-zero power reference signal resources corresponding to the M1 ports, of the time-frequency resources corresponding to the set that includes the N reference signal resources of the user equipment.

Optionally, the method further includes:

a signal received by the user equipment in the non-zero power reference signal resource includes a sum of a signal that is sent by the base station to the user equipment, an interference, and a noise; and a signal received by the user equipment in the zero power resource includes a sum of an interference and a noise.

A sixth aspect of the embodiments of the present invention provides a data transmission method, including:

indicating, by a base station to user equipment, a set that includes N reference signal resources, where N1 reference signal resources in the set of the N reference signal resources are used to perform channel information measurement, and N2 reference signal resources in the set that includes the N reference signal resources are used to perform interference information measurement, where N is a positive integer greater than or equal to 2, N1 is a positive integer less than or equal to N, and N2 is a positive integer less than or equal to N, so that the user equipment performs channel information measurement according to the N1 reference signal resources in the set that includes the N reference signal resources, to obtain channel information, the user equipment performs interference information measurement according to the N2 reference signal resources in the set that includes the N reference signal resources, to obtain interference information, and the user equipment determines channel state information CSI according to the channel information and the interference information; and receiving, by the base station, the channel state information CSI sent by the user equipment.

Optionally, the N1 reference signal resources in the set that includes the N reference signal resources and the N2 reference signal resources in the set that includes the N reference signal resources have an overlapping resource, the N1 reference signal resources are used to perform channel information measurement, and the N2 reference signal resources are used to perform interference information measurement.

Optionally, the N2 reference signal resources in the set that includes the N reference signal resources include N21 reference signal resources configured to have a non-zero power and/or N22 reference signal resources configured to have a zero power, where N21 is less than or equal to N, and N22 is less than or equal to N.

Optionally, the N21 reference signal resources that are included in the N2 reference signal resources and that are configured to have a non-zero power are the same as the N1 reference signal resources in the set that includes the N reference signal resources.

Optionally, the base station sends, to the user equipment, higher layer signaling used to indicate configuration information of the N1 reference signal resources in the set that includes the N reference signal resources, or the base station sends, to the user equipment, dynamic signaling used to indicate configuration information of the N1 reference signal resources in the set that includes the N reference signal resources, where the configuration information includes location information of time-frequency resources of the N1 reference signal resources in the set of the N reference signal resources; and the configuration information further includes at least one of the following:

power information of the N1 reference signal resources in the set of the N reference signal resources, or code resource information of the N1 reference signal resources in the set of the N reference signal resources.

Optionally, X1 ports are multiplexed for the N1 reference signal resources in the set that includes the N reference signal resources;

the base station sends, to the user equipment, configuration information, where the configuration information is used to indicate that M1 ports of the X1 ports are configured to send a first reference signal used to perform channel measurement, where the first reference signal is a non-zero power reference signal, and M1 is less than or equal to X1; and the base station sends the first reference signal to the user equipment by using the M1 ports of the X1 ports, so that the user equipment performs channel measurement according to the first reference signal that is obtained by using the M1 ports of the X1 ports.

Optionally, the configuration information includes first indication information and second indication information, the first indication information is information that is obtained by the user equipment by using higher layer signaling, the first indication information is used to indicate the X1 ports multiplexed for the N1 reference signal resources in the set of the N reference signal resources, the second indication information is information obtained by the user equipment by using dynamic signaling, and the second indication information is used to indicate the M1 ports of the X1 ports multiplexed for the N1 reference signal resources in the set of the N reference signal resources.

Optionally, the multiplexing of the X1 ports for the N1 reference signal resources in the set that includes the N reference signal resources is code division multiplexing; or the multiplexing of the X1 ports for the N1 reference signal resources in the set that includes the N reference signal resources is time-frequency multiplexing and code division multiplexing.

Optionally, the base station sends, to the user equipment, higher layer signaling used to indicate configuration information of the N2 reference signal resources in the set that includes the N reference signal resources, or the base station sends, to the user equipment, dynamic signaling used to indicate configuration information of the N2 reference signal resources in the set that includes the N reference signal resources, where the configuration information includes location information of time-frequency resources of the N2 reference signal resources; and the configuration information further includes at least one of the following:

power information of the N2 reference signal resources, or code resource information of the N2 reference signal resources.

Optionally, the method further includes:

determining, by the user equipment, configuration information of the set that includes the N reference signal resources according to prestored indication information, where the indication information is agreed upon in advance by the base station and the user equipment, and the indication information is used to indicate the configuration information of the set that includes the N reference signal resources; or sending, by the base station to the user equipment, higher layer signaling used to indicate a configuration of the set that includes the N reference signal resources; or sending, by the base station to the user equipment, dynamic signaling used to indicate a configuration and information of the set that includes the N reference signal resources.

Optionally, the method further includes:

the configuration information includes third indication information and fourth indication information, and the third indication information is information that is obtained by the user equipment by using higher layer signaling;

the third indication information includes location information of time-frequency resources of the set of the N reference signal resources;

the third indication information further includes at least one of the following: power information of the set of the N reference signal resources, or code resource information of the set of the N reference signal resources; and the fourth indication information is used to indicate a target port in a range of the time-frequency resources that are of the set of the N reference signal resources and that are indicated by the third indication information, where the target port is the M1 ports of the X1 ports multiplexed for the N1 reference signal resources in the set of the N reference signal resources.

Optionally, the user equipment determines, according to the location information of the time-frequency resources of the set that includes the N reference signal resources and the location information of the time-frequency resources of the N1 reference signal resources in the set that includes the N reference signal resources, locations of time-frequency resources of the N2 reference signal resources in the set that includes the N reference signal resources.

Optionally, X1 ports are multiplexed for the N1 reference signal resources in the set that includes the N reference signal resources, and M1 ports of the X1 ports are configured to send a non-zero power reference signal used to perform channel measurement, where M1 is less than or equal to X1; and the user equipment determines, according to locations of time-frequency resources of the set that includes the N reference signal resources and the M1 ports of the X1 ports, locations of time-frequency resources of the N2 reference signal resources in the set that includes the N reference signal resources.

Optionally, the user equipment performs interference measurement by using N2 reference signals in the set that includes the N reference signal resources, where the N2 reference signal resources in the set that includes the N reference signal resources include a first reference signal resource and a second reference signal resource, the first reference signal resource is non-zero power reference signal resources corresponding to the M1 ports of the X1 ports of the user equipment, and the second reference signal resource is a zero power reference signal assumed by the user equipment, where the second reference signal resource is a corresponding time-frequency resource, other than the non-zero power reference signal resources corresponding to the M1 ports, of the time-frequency resources corresponding to the set that includes the N reference signal resources of the user equipment.

A seventh aspect of the embodiments of the present invention provides user equipment, including:

a first unit, configured to perform channel information measurement according to N1 reference signal resources in a set that includes N reference signal resources, to obtain channel information, where N is a positive integer greater than or equal to 2, and N1 is a positive integer less than or equal to N;

a second unit, configured to perform interference information measurement according to N2 reference signal resources in the set that includes the N reference signal resources, to obtain interference information, where N2 is a positive integer less than or equal to N;

a third unit, configured to determine channel state information CSI according to the channel information and the interference information; and a fourth unit, configured to send the determined channel state information CSI to a base station.

Optionally, the N1 reference signal resources in the set that includes the N reference signal resources and the N2 reference signal resources in the set that includes the N reference signal resources have an overlapping resource, the N1 reference signal resources are used to perform channel information measurement, and the N2 reference signal resources are used to perform interference information measurement.

Optionally, the N2 reference signal resources in the set that includes the N reference signal resources include N21 reference signal resources configured to have a non-zero power and/or N22 reference signal resources configured to have a zero power, where N21 is less than or equal to N, and N22 is less than or equal to N.

Optionally, the user equipment performs dynamic switching among a first interference measurement resource, a second interference measurement resource, and a third interference measurement resource, where the first interference measurement resource is exclusively a non-zero power reference signal resource, a quantity of the non-zero power reference signal resources is N21, and N21 is equal to N; the second interference measurement resource is exclusively a zero power reference signal resource, where a quantity of the zero power reference signal resources is N22, and N22 is equal to N; and the third interference measurement resource includes a non-zero power reference signal resource and a zero power reference signal resource, where a quantity of the non-zero power reference signal resources is N21, N21 is less than N, a quantity of the zero power reference signal resources is N22, and N22 is less than N.

Optionally, the N21 reference signal resources that are included in the N2 reference signal resources and that are configured to have a non-zero power are the same as the N1 reference signal resources in the set that includes the N reference signal resources.

Optionally, the unit is further configured to receive higher layer signaling that is sent by the base station and that is used to indicate configuration information of the N1 reference signal resources in the set that includes the N reference signal resources, or receive, by the user equipment, dynamic signaling that is sent by the base station and that is used to indicate configuration information of the N1 reference signal resources in the set that includes the N reference signal resources, where the configuration information includes location information of time-frequency resources of the N1 reference signal resources in the set of the N reference signal resources; and the configuration information further includes at least one of the following:

power information of the N1 reference signal resources in the set of the N reference signal resources, or code resource information of the N1 reference signal resources in the set of the N reference signal resources.

Optionally, X1 ports are multiplexed for the N1 reference signal resources in the set that includes the N reference signal resources;

the unit is further configured to receive configuration information sent by the base station, where the configuration information is used to indicate that M1 ports of the X1 ports are configured to send a first reference signal used to perform channel measurement, where the first reference signal is a non-zero power reference signal, and M1 is less than or equal to X1; and the unit is further configured to: receive the first reference signal by using the M1 ports of the X1 ports, and perform channel measurement by using the first reference signal that is obtained by using the M1 ports of the X1 ports.

Optionally, the configuration information includes first indication information and second indication information, the first indication information is information that is obtained by the user equipment by using higher layer signaling, the first indication information is used to indicate the X1 ports multiplexed for the N1 reference signal resources in the set of the N reference signal resources, the second indication information is information obtained by the user equipment by using dynamic signaling, and the second indication information is used to indicate the M1 ports of the X1 ports multiplexed for the N1 reference signal resources in the set of the N reference signal resources.

Optionally, the multiplexing of the X1 ports for the N1 reference signal resources in the set that includes the N reference signal resources is code division multiplexing; or the multiplexing of the X1 ports for the N1 reference signal resources in the set that includes the N reference signal resources is time-frequency multiplexing and code division multiplexing.

Optionally, before the performing, by the user equipment, interference measurement according to N2 reference signal resources in the set that includes the N reference signal resources, the method further includes:

receiving, by the user equipment, higher layer signaling that is sent by the base station and that is used to indicate configuration information of the N2 reference signal resources in the set that includes the N reference signal resources, or receiving, by the user equipment, dynamic signaling that is sent by the base station and that is used to indicate configuration information of the N2 reference signal resources in the set that includes the N reference signal resources, where the configuration information includes location information of time-frequency resources of the N2 reference signal resources; and the configuration information further includes at least one of the following:

power information of the N2 reference signal resources, or code resource information of the N2 reference signal resources.

Optionally, the method further includes:

determining, by the user equipment, configuration information of the set that includes the N reference signal resources according to prestored indication information, where the indication information is agreed upon in advance by the base station and the user equipment, and the indication information is used to indicate the configuration information of the set that includes the N reference signal resources; or receiving, by the user equipment, higher layer signaling that is sent by the base station and that is used to indicate a configuration of the set that includes the N reference signal resources; or receiving, by the user equipment, dynamic signaling that is sent by the base station and that is used to indicate a configuration and information of the set that includes the N reference signal resources.

Optionally, the method further includes:

the configuration information includes third indication information and fourth indication information, and the third indication information is information that is obtained by the user equipment by using higher layer signaling;

the third indication information includes location information of time-frequency resources of the set of the N reference signal resources;

the third indication information further includes at least one of the following: power information of the set of the N reference signal resources, or code resource information of the set of the N reference signal resources; and the fourth indication information is used to indicate a target port in a range of the time-frequency resources that are of the set of the N reference signal resources and that are indicated by the third indication information, where the target port is the M1 ports of the X1 ports multiplexed for the N1 reference signal resources in the set of the N reference signal resources.

Optionally, before the performing, by the user equipment, interference measurement according to N2 reference signal resources in the set that includes the N reference signal resources, the method further includes:

determining, by the user equipment according to the location information of the time-frequency resources of the set that includes the N reference signal resources and the location information of the time-frequency resources of the N1 reference signal resources in the set that includes the N reference signal resources, locations of time-frequency resources of the N2 reference signal resources in the set that includes the N reference signal resources.

Optionally, X1 ports are multiplexed for the N1 reference signal resources in the set that includes the N reference signal resources, and M1 ports of the X1 ports are configured to send a non-zero power reference signal used to perform channel measurement, where M1 is less than or equal to X1; and before the performing, by the user equipment, interference measurement according to N2 reference signal resources in the set that includes the N reference signal resources, the method further includes:

determining, by the user equipment according to locations of time-frequency resources of the set that includes the N reference signal resources and the M1 ports of the X1 ports, locations of time-frequency resources of the N2 reference signal resources in the set that includes the N reference signal resources.

Optionally, the performing, by the user equipment, interference measurement according to N2 reference signal resources in the set that includes the N reference signal resources includes: performing, by the user equipment, interference measurement by using N2 reference signals in the set that includes the N reference signal resources, where the N2 reference signal resources in the set that includes the N reference signal resources include a first reference signal resource and a second reference signal resource, the first reference signal resource is non-zero power reference signal resources corresponding to the M1 ports of the X1 ports of the user equipment, and the second reference signal resource is a zero power reference signal assumed by the user equipment, where the second reference signal resource is a corresponding time-frequency resource, other than the non-zero power reference signal resources corresponding to the M1 ports, of the time-frequency resources corresponding to the set that includes the N reference signal resources of the user equipment.

Optionally, the method further includes:

a signal received by the user equipment in the non-zero power reference signal resource includes a sum of a signal that is sent by the base station to the user equipment, an interference, and a noise; and a signal received by the user equipment in the zero power resource includes a sum of an interference and a noise.

An eighth aspect of the embodiments of the present invention provides a base station, including:

a fifth unit, configured to indicate, to user equipment, a set that includes N reference signal resources, where N1 reference signal resources in the set of the N reference signal resources are used to perform channel information measurement, and N2 reference signal resources in the set that includes the N reference signal resources are used to perform interference information measurement, where N is a positive integer greater than or equal to 2, N1 is a positive integer less than or equal to N, and N2 is a positive integer less than or equal to N, so that the user equipment performs channel information measurement according to the N1 reference signal resources in the set that includes the N reference signal resources, to obtain channel information, the user equipment performs interference information measurement according to the N2 reference signal resources in the set that includes the N reference signal resources, to obtain interference information, and the user equipment determines channel state information CSI according to the channel information and the interference information; and a sixth unit, configured to receive the channel state information CSI sent by the user equipment.

Optionally, the N1 reference signal resources in the set that includes the N reference signal resources and the N2 reference signal resources in the set that includes the N reference signal resources have an overlapping resource, the N1 reference signal resources are used to perform channel information measurement, and the N2 reference signal resources are used to perform interference information measurement.

Optionally, the N2 reference signal resources in the set that includes the N reference signal resources include N21 reference signal resources configured to have a non-zero power and/or N22 reference signal resources configured to have a zero power, where N21 is less than or equal to N, and N22 is less than or equal to N.

Optionally, the N21 reference signal resources that are included in the N2 reference signal resources and that are configured to have a non-zero power are the same as the N1 reference signal resources in the set that includes the N reference signal resources.

Optionally, the base station sends, to the user equipment, higher layer signaling used to indicate configuration information of the N1 reference signal resources in the set that includes the N reference signal resources, or the base station sends, to the user equipment, dynamic signaling used to indicate configuration information of the N1 reference signal resources in the set that includes the N reference signal resources, where the configuration information includes location information of time-frequency resources of the N1 reference signal resources in the set of the N reference signal resources; and the configuration information further includes at least one of the following:

power information of the N1 reference signal resources in the set of the N reference signal resources, or code resource information of the N1 reference signal resources in the set of the N reference signal resources.

Optionally, X1 ports are multiplexed for the N1 reference signal resources in the set that includes the N reference signal resources;

the base station sends, to the user equipment, configuration information, where the configuration information is used to indicate that M1 ports of the X1 ports are configured to send a first reference signal used to perform channel measurement, where the first reference signal is a non-zero power reference signal, and M1 is less than or equal to X1; and the base station sends the first reference signal to the user equipment by using the M1 ports of the X1 ports, so that the user equipment performs channel measurement according to the first reference signal that is obtained by using the M1 ports of the X1 ports.

Optionally, the configuration information includes first indication information and second indication information, the first indication information is information that is obtained by the user equipment by using higher layer signaling, the first indication information is used to indicate the X1 ports multiplexed for the N1 reference signal resources in the set of the N reference signal resources, the second indication information is information obtained by the user equipment by using dynamic signaling, and the second indication information is used to indicate the M1 ports of the X1 ports multiplexed for the N1 reference signal resources in the set of the N reference signal resources.

Optionally, the multiplexing of the X1 ports for the N1 reference signal resources in the set that includes the N reference signal resources is code division multiplexing; or the multiplexing of the X1 ports for the N1 reference signal resources in the set that includes the N reference signal resources is time-frequency multiplexing and code division multiplexing.

Optionally, the unit is further configured to send, to the user equipment, higher layer signaling used to indicate configuration information of the N2 reference signal resources in the set that includes the N reference signal resources, or send, by the base station to the user equipment, dynamic signaling used to indicate configuration information of the N2 reference signal resources in the set that includes the N reference signal resources, where the configuration information includes location information of time-frequency resources of the N2 reference signal resources; and the configuration information further includes at least one of the following:

power information of the N2 reference signal resources, or code resource information of the N2 reference signal resources.

Optionally, the unit is further configured to enable the user equipment to determine, according to prestored indication information, configuration information of the set that includes the N reference signal resources, where the indication information is agreed upon in advance by the base station and the user equipment, and the indication information is used to indicate the configuration information of the set that includes the N reference signal resources; or the unit is further configured to send, to the user equipment, higher layer signaling used to indicate a configuration of the set that includes the N reference signal resources; or the unit is further configured to send, to the user equipment, dynamic signaling used to indicate a configuration and information of the set that includes the N reference signal resources.

Optionally, the configuration information includes third indication information and fourth indication information, and the third indication information is information that is obtained by the user equipment by using higher layer signaling;

the third indication information includes location information of time-frequency resources of the set of the N reference signal resources;

the third indication information further includes at least one of the following:

power information of the set of the N reference signal resources, or code resource information of the set of the N reference signal resources; and the fourth indication information is used to indicate a target port in a range of the time-frequency resources that are of the set of the N reference signal resources and that are indicated by the third indication information, where the target port is the M1 ports of the X1 ports multiplexed for the N1 reference signal resources in the set of the N reference signal resources.

Optionally, the user equipment determines, according to the location information of the time-frequency resources of the set that includes the N reference signal resources and the location information of the time-frequency resources of the N1 reference signal resources in the set that includes the N reference signal resources, locations of time-frequency resources of the N2 reference signal resources in the set that includes the N reference signal resources.

Optionally, X1 ports are multiplexed for the N1 reference signal resources in the set that includes the N reference signal resources, and M1 ports of the X1 ports are configured to send a non-zero power reference signal used to perform channel measurement, where M1 is less than or equal to X1; and the user equipment determines, according to locations of time-frequency resources of the set that includes the N reference signal resources and the M1 ports of the X1 ports, locations of time-frequency resources of the N2 reference signal resources in the set that includes the N reference signal resources.

Optionally, the user equipment performs interference measurement by using N2 reference signals in the set that includes the N reference signal resources, where the N2 reference signal resources in the set that includes the N reference signal resources include a first reference signal resource and a second reference signal resource, the first reference signal resource is non-zero power reference signal resources corresponding to the M1 ports of the X1 ports of the user equipment, and the second reference signal resource is a zero power reference signal assumed by the user equipment, where the second reference signal resource is a corresponding time-frequency resource, other than the non-zero power reference signal resources corresponding to the M1 ports, of the time-frequency resources corresponding to the set that includes the N reference signal resources of the user equipment.

Embodiments of the present invention disclose a data transmission method and a related device. The data transmission method includes: determining, by user equipment, a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and performing, by the user equipment, measurement and feedback according to the determined measurement procedure and/or the determined type of the fed-back CSI. The user equipment can determine different measurement procedures and different types of fed-back channel state information CSI according to different types of measurement processes, so that a user can feed back more accurate downlink channel information to a base station according to the different measurement processes and different types of fed-back channel state information CSI, thereby improving performance of data transmission between the base station and the user equipment.

DESCRIPTION OF EMBODIMENTS

Figure 1:
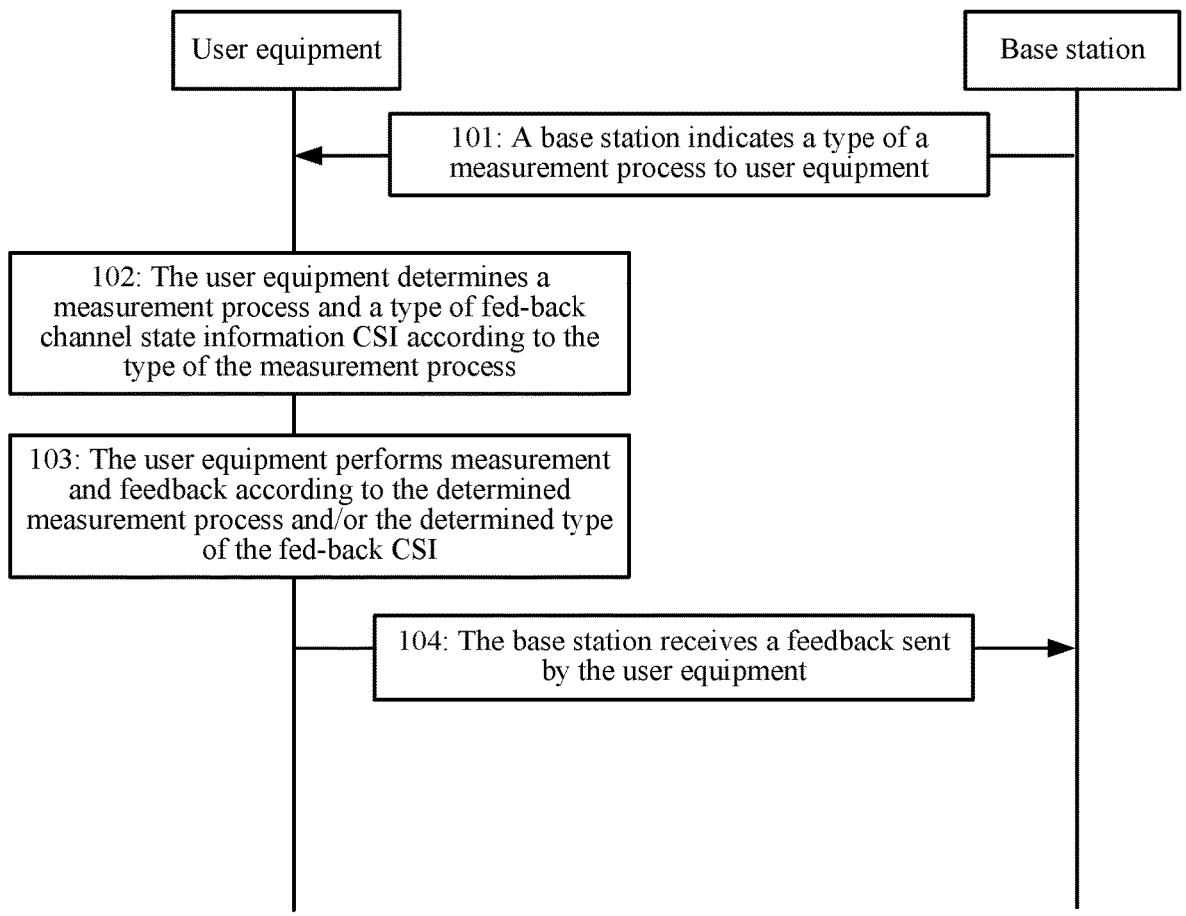
FIG. 1 is a flowchart of steps of an embodiment of a data transmission method according to an embodiment of the present invention.

A data transmission method provided in an embodiment of the present invention is described below in detail with reference to FIG. 1.

The data transmission method includes the following steps.

101: A base station indicates a type of a measurement process to user equipment.

Wherein the type of the measurement process includes a definition of a signal measurement pilot and a definition of an interference measurement pilot.

That is, the base station instructs, by using the type of the measurement process, the user equipment to determine a measurement procedure and a type of fed-back channel state information CSI.

102: The user equipment determines a measurement procedure and a type of fed-back channel state information CSI according to the type of the measurement process.

Specifically, if either signal measurement pilots or interference measurement pilots that are sent by the base station are different, measurement procedures determined by the user equipment are different.

Different types of measurement processes correspond to different measurement procedures and different types of fed-back CSI.

103: The user equipment performs measurement and feedback according to the determined measurement procedure and/or the determined type of the fed-back CSI.

104: The base station receives a feedback sent by the user equipment.

The feedback is generated by the user equipment according to the determined measurement procedure and/or fed-back CSI.

In this embodiment, the base station may perform scheduling of related downlink data according to a feedback sent by the user equipment.

In this embodiment of the present invention, user equipment can determine different measurement procedures and different types of fed-back channel state information CSI according to different types of measurement processes, so that a user can feed back more accurate downlink channel information to a base station, thereby improving performance of data transmission between the base station and the user equipment.

Further, an example of how the user equipment specifically determines a measurement procedure and a type of fed-back channel state information CSI according to a type of a measurement process is described below with reference to the accompanying drawings. It should be noted that the following description of determining, by the user equipment, a measurement process and a type of fed-back channel state information CSI is an example, and does not constitute a limitation.

Figure 2:
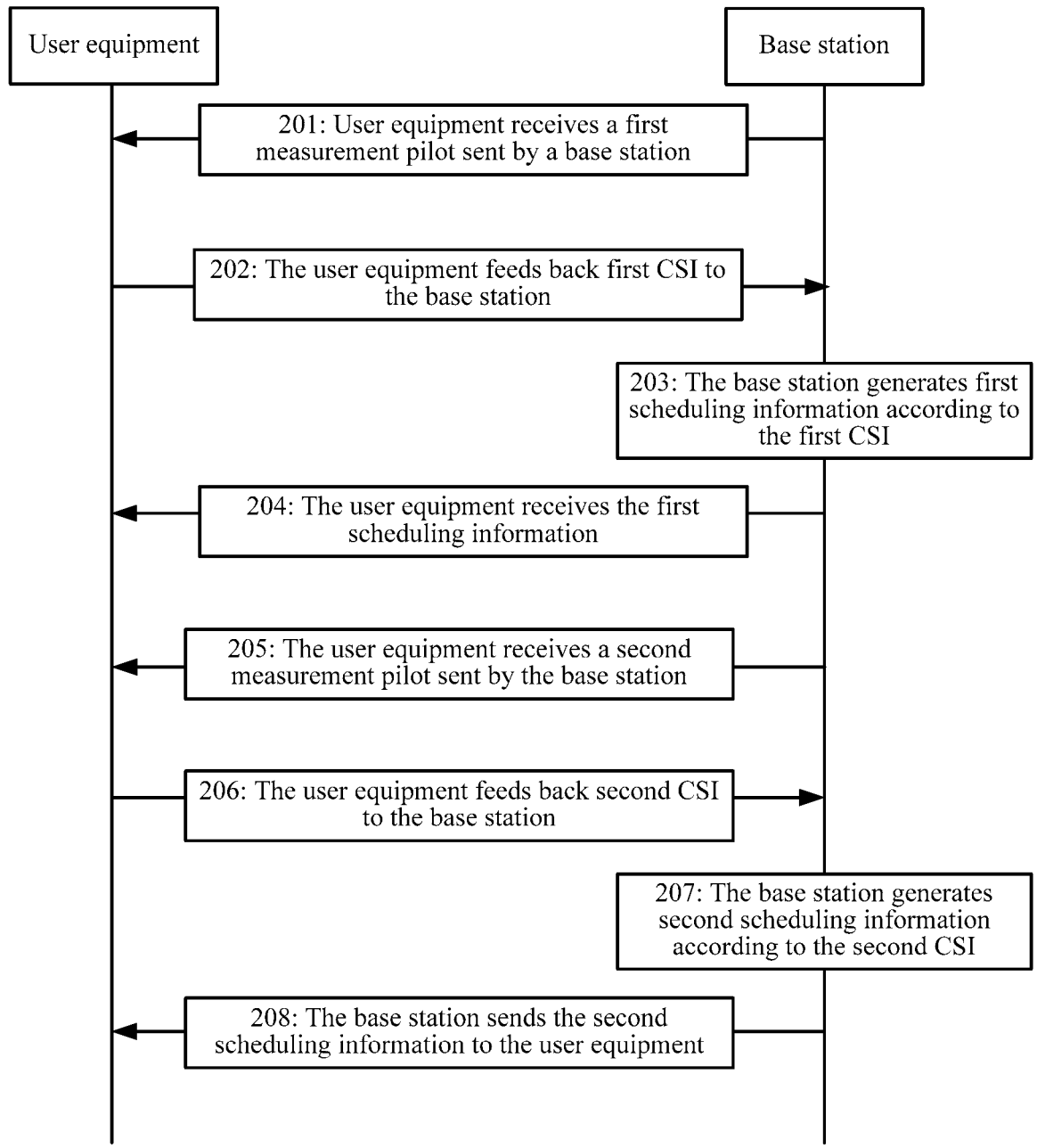
FIG. 2 is a flowchart of steps of another embodiment of a data transmission method according to an embodiment of the present invention.

First, the data transmission method is described in detail with reference to FIG. 2 and FIG. 3.

201: The user equipment receives a first measurement pilot sent by the base station.

Figure 3:
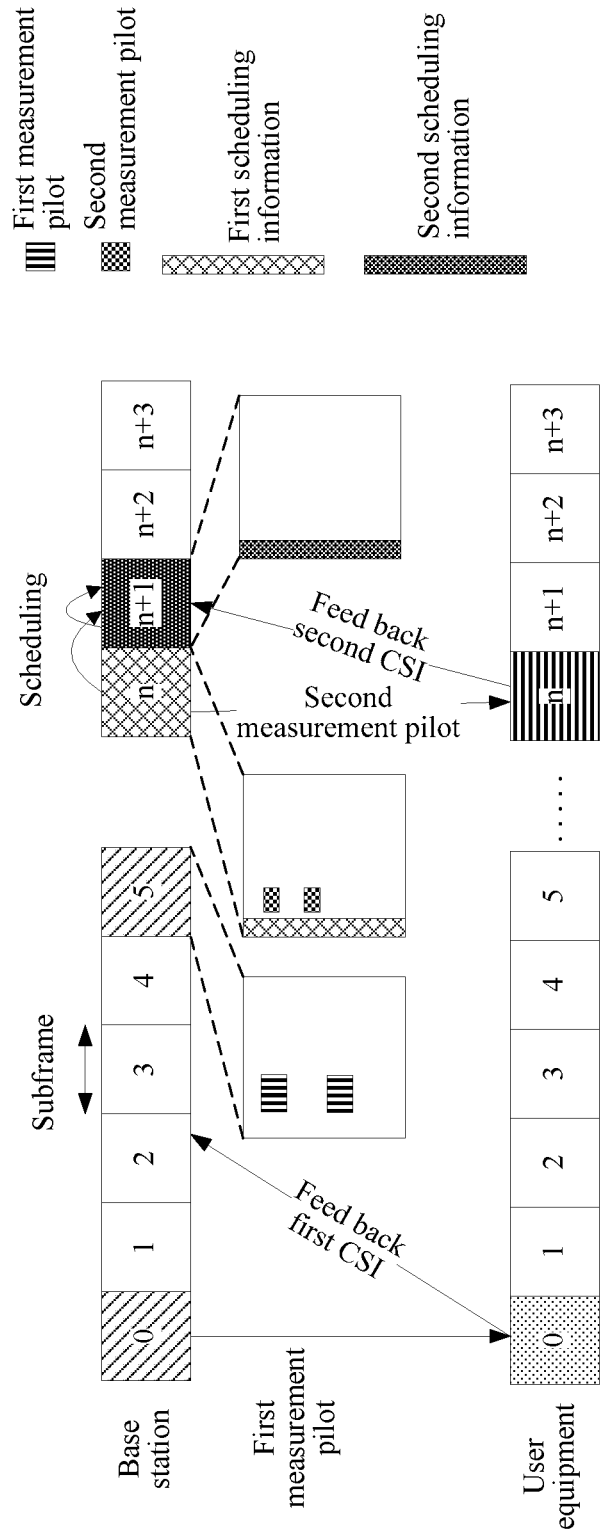
FIG. 3 is a schematic diagram of an embodiment of a data transmission scenario according to an embodiment of the present invention.

As shown in FIG. 3, the base station may periodically send the first measurement pilot. Optionally, the base station sends the first measurement pilot by a period of 5 ms.

Certainly, a sending manner and a sending period of the first measurement pilot are not limited in this embodiment.

Optionally, the first measurement pilot is a precoded pilot, or the first measurement pilot is a non-precoded pilot.

202: The user equipment feeds back first CSI to the base station.

Specifically, if the signal measurement pilot defined in the measurement process is a first measurement pilot, the user equipment determines that the type of the fed-back CSI is first CSI.

Specifically, if the first measurement pilot is a non-precoded pilot, the first CSI includes a rank indication RI, a precoding matrix indication PMI, and a channel quality indication CQI.

If the first measurement pilot is a precoded pilot, the first CSI includes an RI and a PMI.

203: The base station generates first scheduling information according to the first CSI.

Specifically, when the base station needs to perform user scheduling in an $(n+1)^{th}$ subframe, the base station sends the first scheduling information in an $n^{th}$ subframe.

The first scheduling information includes a scheduled frequency domain resource of a physical downlink shared channel PDSCH, a new data indication, a redundancy version, a quasi co-location, a scrambling ID, and the like. In the $n^{th}$ subframe, the base station sends only the first scheduling information but does not send a PDSCH, and sends a second measurement pilot in a frequency domain resource range indicated in the first scheduling information. The first scheduling information indicates configuration information of the second measurement pilot. For example, the configuration information of the second measurement pilot indicates a time-frequency resource location, a port number, power information, and the like of the second measurement pilot.

204: The user equipment receives the first scheduling information.

The user equipment can determine the configuration information of the second measurement pilot according to the first scheduling information.

205: The user equipment receives a second measurement pilot sent by the base station.

Specifically, the user determines the time-frequency resource location of the second measurement pilot according to the configuration information of the second measurement pilot, and receives the second measurement pilot at the designated time-frequency resource location.

206: The user equipment feeds back second CSI to the base station.

If the signal measurement pilot defined in the measurement process is a second measurement pilot, the user equipment determines that the type of the fed-back CSI is second CSI.

A feedback amount included in the first CSI and a feedback amount included in the second CSI are different.

Optionally, a time-frequency resource location of the second measurement pilot is in a first slot of a subframe.

The user equipment feeds back the second CSI in a second slot of the subframe at which the second measurement pilot is located.

Specifically, in this embodiment, the second measurement pilot is sent in a first slot slot of the $n^{th}$ subframe, and the user equipment completes measurement and reporting of the second CSI in a second slot of the $n^{th}$ subframe.

Specifically, the second CSI includes an RI, a PMI, and a CQI, or the second CSI includes a CQI, or the second CSI includes an index BI that indicates a selected beam, an RI, and a CQI.

The BI (beam index, beam index) is a resource indication or a port indication for selection from at least two first measurement pilots or ports, and each port corresponds to one beam direction.

For the CQI included in the second CSI, it is assumed that an interference is an instantaneous interference.

Optionally, the $n^{th}$ subframe used to send the second measurement pilot may be further used to send configuration signaling.

The configuration signaling and the second measurement pilot are in a same slot, the configuration signaling is used to configure the second measurement pilot, and a symbol at which the configuration signaling is located precedes a symbol used to send the second measurement pilot.

Further optionally, the $n^{th}$ subframe used to send the second measurement pilot may be further used to send trigger signaling.

The trigger signaling and the second measurement pilot are in a same slot, the trigger signaling is used to instruct the user equipment to feed back CSI, the trigger signaling and the second measurement pilot are in a same slot, and a symbol at which the trigger signaling is located precedes a symbol used to send the second measurement pilot.

As can be seen, as shown in this embodiment, the configuration signaling, the second measurement pilot, and the trigger signaling are sent in the same $n^{th}$ subframe.

Further optionally, the configuration signaling and the trigger signaling are in same DCI.

207: The base station generates second scheduling information according to the second CSI.

208: The base station sends the second scheduling information to the user equipment.

Specifically, after obtaining CQI information in the second slot of the $n^{th}$ subframe, the base station determines a link adaptation modulation and coding scheme MCS and a transport block size of the user equipment, and then sends the second scheduling information in the $(n+1)^{th}$ subframe.

More specifically, the second scheduling information includes information about the MCS and the TB size, and a PDSCH is sent at the same time. A user determines a scheduling resource of a frequency domain and a scheduling resource of a time domain of the PDSCH according to the first scheduling information, and determines an MCS and a TB size of the PDSCH according to the second scheduling information, so as to perform data demodulation.

The second scheduling information may use a similar PDCCH format 3 manner, or a PHICH manner.

Optionally, in this embodiment, a time interval from a reference resource of the second CSI that is obtained by measurement by the user equipment according to the second measurement pilot to a reporting moment is X1, and a time interval from a reference resource of the first CSI that is obtained by measurement according to the first measurement pilot to a reporting moment is X2, where X1<X2.

The reference resource is a subframe used to send the second measurement pilot.

Optionally, a time interval from a reference resource of the second CSI that is obtained by measurement by the user equipment according to the second measurement pilot to a reporting moment is X1, where X1 is configured by using higher layer signaling or is configured by using dynamic signaling.

Optionally, a time interval from a reference resource of measurement by the user equipment according to the second measurement pilot to a reporting moment is X1, where X1 is related to a quantity of resources of the second measurement pilot that are included in one measurement procedure and/or a quantity of ports included in each second measurement pilot.

In this embodiment, the base station may configure the dynamic signaling, and send the dynamic signaling to the user equipment.

The base station may instruct, by using the dynamic signaling, the user equipment to perform CSI feedback.

Specifically, the dynamic signaling indicates at least two of the following:

a CSI feedback type that corresponds to at least one in a type set of CSI feedbacks, a frequency domain granularity of CSI, a corresponding feedback moment used to feed back the CSI feedback type, or an uplink channel type of a CSI feedback.

Specifically, the frequency domain granularity of CSI shown in this embodiment includes a subband index of a CSI feedback and/or a size of a subband for performing CSI feedback.

The feedback moment and the CSI feedback type are not limited in this embodiment.

More specifically, the type set of CSI feedbacks includes at least two CSI feedback types of the following:

an RI, a PMI, a CQI, an interference power, an interference covariance matrix, a channel covariance matrix, a channel covariance matrix, a CQI, beam selection information, a factor for synthesis of beams, indication information used to instruct the user equipment to perform explicit feedback, or indication information used to instruct the user equipment to perform implicit feedback.

As can be seen, by means of the method shown in this embodiment, the base station can indicate, to the user equipment according to a specific scenario and a scheduling requirement, a feedback moment and a type of a CSI feedback that is fed back at the feedback moment, thereby reducing feedback of content that does not need to be fed back and a feedback delay, and improving efficiency of information transmission between the base station and the user equipment.

To better understand this embodiment of the present invention, the dynamic signaling is specifically described below.

Optionally, in this embodiment, in a process in which the base station configures the dynamic signaling, target CSI feedback types may correspond to different feedback moments.

The target CSI feedback type is any one of the at least two CSI feedback types included in the type set of CSI feedbacks.

For example, if the base station notifies, by using the dynamic signaling, the user equipment that the type set of CSI feedbacks includes an RI and a CQI, the target CSI feedback type is an RI and a CQI.

The user equipment can determine, according to the dynamic signaling, a feedback moment used to feed back any one of the at least two target CSI feedback types.

Specifically, in this embodiment, feedback moments of the target CSI feedback types are configured independently.

Optionally, in this embodiment, the target CSI feedback types may have a same feedback moment.

If an example in which the target CSI feedback type is an RI and a CQI and the base station sends the dynamic signaling to the user equipment at an $n^{th}$ moment is used, the dynamic signaling may indicate that both the RI and the CQI are fed back at a same $(n+p)^{th}$ moment. In this embodiment, an example of the $(n+p)^{th}$ moment is not specifically limited. The $(n+p)^{th}$ moment may represent an $(n+p)^{th}$ subframe or an $(n+p)^{th}$ OFDM symbol or an $(n+p)^{th}$ slot, and n and p are positive integers.

Optionally, in this embodiment, the target CSI feedback types may have different feedback moments, that is, different target CSI feedback types have different feedback moments.

If an example in which the target CSI feedback type is an RI and a CQI and the base station sends the dynamic signaling to the user equipment at an $n^{th}$ moment is used, the dynamic signaling may indicate that the RI is fed back at an $(n+p1)^{th}$ moment and the CQI is fed back at an $(n+p2)^{th}$ moment. In this embodiment, examples of the $(n+p1)^{th}$ moment and the $(n+p2)^{th}$ moment are not specifically limited. The $(n+p1)^{th}$ moment may represent an $(n+p1)^{th}$ subframe or an $(n+p1)^{th}$ OFDM symbol or an $(n+p1)^{th}$ slot. The $(n+p2)^{th}$ moment may represent an $(n+p2)^{th}$ subframe or an $(n+p2)^{th}$ OFDM symbol or an $(n+p2)^{th}$ slot. n, p1, and p2 are positive integers.

Optionally, in this embodiment, if the type set of CSI feedbacks includes multiple target CSI feedback types, at least two target CSI feedback types of the multiple target CSI feedback types have a same feedback moment.

If an example in which the target CSI feedback type is an RI, a CQI, and a channel covariance matrix and the base station sends the dynamic signaling to the user equipment at an $n^{th}$ moment is used, the dynamic signaling may indicate that the RI and the channel covariance matrix are fed back at an $(n+p1)^{th}$ moment and the CQI is fed back at an $(n+p2)^{th}$ moment. For n, p1, and p2, refer to the foregoing description. Details are not described herein.

Optionally, in this embodiment, the user equipment determines, according to the dynamic signaling, that the feedback moment used to feed back any one of the target CSI feedback types is a target feedback moment, and the target feedback moment includes at least two different moments. For example, for a target CSI feedback type, feedback at multiple moments may increase reliability of transmission of the target CSI feedback type.

That is, the dynamic signaling indicates that one target CSI feedback type has at least two different feedback moments.

If an example in which the target CSI feedback type is an RI and the base station sends the dynamic signaling to the user equipment at an $n^{th}$ moment is used, the dynamic signaling may indicate that the RI is fed back at both an $(n+p1)^{th}$ moment and an $(n+p2)^{th}$ moment.

In this embodiment, the user equipment can further configure a reference signal according to the dynamic.

Specifically, the base station sends reference signal configuration information to the user equipment by using the dynamic signaling, so that the user equipment obtains the reference signal configuration information according to the dynamic signaling.

The user equipment determines at least one reference signal according to the dynamic signaling configuration information, where the at least one piece of reference signal configuration information is used to configure the at least one reference signal.

Any one of the at least one reference signal corresponds to at least one CSI feedback type included in the type set of CSI feedbacks, so as to enable the user equipment to perform channel measurement based on the reference signal and according to a CSI feedback type correlated to the reference signal, to obtain the CSI feedback type and perform feedback.

Specifically, reference signals may correspond to different CSI feedback types included in the type set of CSI feedbacks, or one reference signal may correspond to at least two CSI feedback types included in the type set of CSI feedbacks.

More specifically, in this embodiment, the reference signals configured by the user equipment and the CSI feedback types that correspond to the reference signals are configured independently.

For example, the user equipment determines, according to the dynamic signaling, that one target CSI feedback type is an RI, and determines that another target CSI feedback type is a CQI, and the base station sends the dynamic signaling to the user equipment at an $n^{th}$ moment.

The user equipment obtains the reference signal configuration information according to the dynamic signaling, and configures a reference signal according to the reference signal configuration information, so that different reference signals correspond to different CSI feedback types.

Certainly, in this embodiment, the description of a correspondence manner between the reference signal and a CSI feedback type is an optional example. That is, in a specific application, one reference signal may also correspond to at least two CSI feedback types.

In this embodiment, an example in which different reference signals correspond to different CSI feedback types is used for description.

The user equipment may configure, in the same dynamic signaling, that a first reference signal is a first CSI-RS (channel state information reference signal), and configure that a CSI feedback type corresponding to the first CSI-RS may be an RI (rank indication). The user equipment may further configure, in the dynamic signaling, that a second reference signal is a second CSI-RS configuration 2, and configure that a CSI feedback type corresponding to the second CSI-RS may be a CQI (channel quality indication).

Optionally, in this embodiment, the base station can further indicate, to the user equipment by using the dynamic signaling, an uplink channel type used for a CSI feedback.

Specifically, the base station may notify the user equipment of uplink channel type configuration information of a CSI feedback by using the dynamic signaling. The user equipment determines uplink channel type configuration information of at least one CSI feedback according to the dynamic signaling. The user equipment determines an uplink channel type of at least one CSI feedback according to the uplink channel type configuration information of at least one CSI feedback. The uplink channel type configuration information of at least one CSI feedback is used to configure the uplink channel type of at least one CSI feedback.

Any one of the at least one feedback channel corresponds to at least one CSI feedback type included in the type set of CSI feedbacks.

More specifically, in this embodiment, uplink channel types of CSI feedbacks corresponding to the CSI feedback types configured by the user equipment are configured independently.

For example, the user equipment determines, according to the dynamic signaling, that one target CSI feedback type is an RI, and determines that another target CSI feedback type is a CQI, and the base station sends the dynamic signaling to the user equipment at an $n^{th}$ moment.

The user equipment configures an uplink channel type of a CSI feedback according to the dynamic signaling, so that different CSI feedback types correspond to independent uplink channel types of CSI feedbacks.

Certainly, the description of a correspondence manner between the feedback channel and a CSI feedback type in this embodiment is an optional example. That is, in a specific application, one CSI feedback type may also correspond to uplink channel types of at least two CSI feedbacks.

In this embodiment, an example in which different feedback channels correspond to different CSI feedback types is used for description.

In this embodiment, the user equipment may configure that a type of a first CSI feedback is an RI, and configure that an uplink channel type of a CSI feedback corresponding to the RI is an uplink channel type PUCCH channel of the first CSI feedback. The user equipment may further configure that a type of a second CSI feedback is a CQI, and an uplink channel type of a CSI feedback corresponding to the CQI is an uplink channel type PUSCH of the second CSI feedback.

In this embodiment, the PUCCH and PUSCH in LTE are used as an example. An uplink channel type of a CSI feedback in another application scenario, such as 5G, may further be another uplink channel type used to feed back a CSI type.

In a process in which the user equipment configures a feedback channel shown in this embodiment, if a configured feedback channel is a PUCCH, multiple users can share the PUCCH, or if a configured feedback channel is a PUSCH, a user exclusively uses a resource in the PUSCH.

A feature of the uplink channel type of the first CSI feedback is that multiple users share the channel, for example, in a code division manner. The uplink channel type of the second CSI feedback is a manner of single-user scheduling, and multiple users do not share the channel.

The uplink channel type of the first CSI feedback and the uplink channel type of the second CSI feedback may further have different numerology, for example, different subcarrier intervals and different symbol lengths.

In the data transmission method shown above, the base station can perform scheduling according to first CSI fed back by the user equipment, and determine configuration information of the second measurement pilot according to the first CSI. The user equipment can feed back second CSI to the base station according to the received second measurement pilot, so that the base station can perform link adaptation according to the second CSI.

The foregoing description of the data transmission method is an example, and does not constitute a limitation. In another example, the user equipment feeds back the first CSI to the base station according to the first measurement pilot, and the base station determines the configuration information of the second measurement pilot according to the first CSI, so that the base station performs scheduling and link adaptation according to the second CSI.

A specific application scenario is used below to describe how the user equipment specifically determines a second measurement pilot according to a measurement signal defined in the measurement process.

In this application scenario, an example in which the user equipment that performs data communication with the base station is first user equipment and second user equipment is used. It should be noted that in this embodiment, a quantity of user equipments that can perform data communication with the base station is not limited.

If the base station does not precode the first measurement pilot, a precoding matrix corresponding to a PMI that is fed back by the first user equipment according to the first measurement pilot is W1, and a precoding matrix corresponding to a PMI that is fed back by the second user equipment according to the first measurement pilot is W2.

The base station performs a ZF operation or another algorithm according to W1 and W2, to obtain that precoding matrices that are obtained after the first user equipment and the second user equipment perform multi-user MIMO system (Multiple-Input Multiple-Output) pairing are respectively W1' and W2'. W1' and W2' are used to respectively precode second measurement pilots of the first user equipment and the second user equipment.

If the first measurement pilot is a precoded pilot, assuming that the first measurement pilot has M ports or M resources, each port corresponds to one beam direction.

An optimal BI fed back by the first user equipment according to the first measurement pilot is BI 0, and an optimal BI fed back by the second user equipment according to the first measurement pilot is BI 1.

The base station performs ZF or another algorithm according to BI 0 and BI 1, to obtain that beam directions that are obtained after the first user equipment and the second user equipment perform multi-user MIMO system pairing are respectively BI 0' and BI 1', and correspondingly uses beams of BI 0' and BI 1' to respectively precode the second measurement pilots of the first user equipment and the second user equipment.

How the user equipment receives the second measurement pilot is described below with reference to a specific application scenario.

For example, the second measurement pilot may be configured by using dynamic signaling, or in a predefined manner, or in a higher layer configuration manner.

Specifically, the second measurement pilot may be a CSI-RS or a DMRS.

For another example, in an application scenario, the user equipment determines the second measurement pilot by using first-type DCI signaling.

Specifically, the base station configures the second measurement pilot by using the first-type DCI signaling.

In a process in which the base station configures the second measurement pilot, the base station needs to notify the user equipment of a pattern pattern of the second measurement pilot, port information of the second measurement pilot, a location of a PRB pair of a frequency domain at which the second measurement pilot is located, and a location of a time domain of the second measurement pilot by using the first-type DCI.

The first-type DCI signaling shown in this application scenario is specially used to configure the second measurement pilot.

Figure 4:
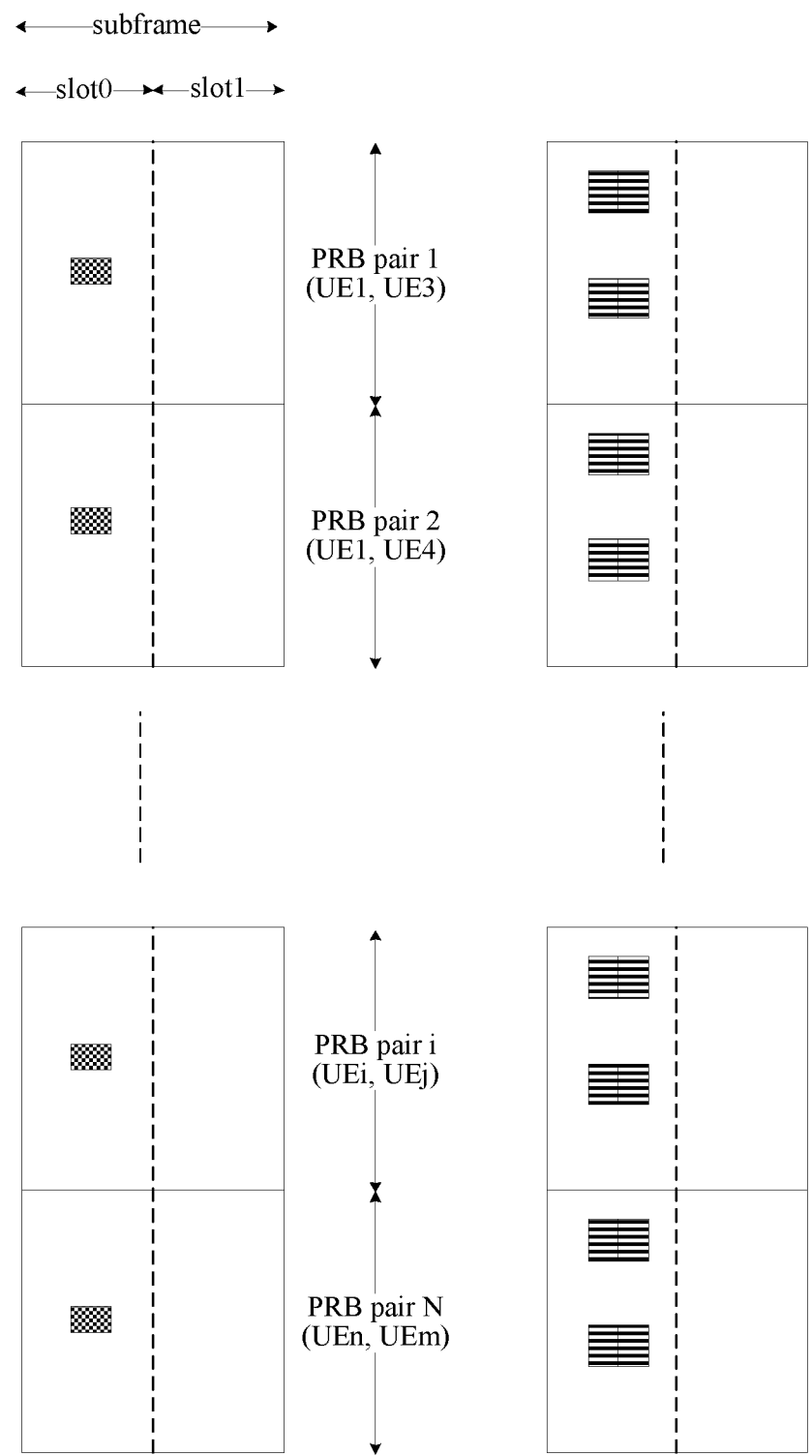
FIG. 4 is a schematic diagram of another embodiment of a data transmission scenario according to an embodiment of the present invention.

For example, as shown in FIG. 4, the first user equipment UE1 performs pairing with third user equipment UE3 in a first PRB pair 1.

UE1 uses a CSI-RS port 15, and UE3 uses a CSI-RS port 16.

In a second PRB pair 2, UE1 performs pairing with fourth user equipment UE4.

UE1 uses the CSI-RS port 16, and UE4 uses the CSI-RS port 15.

Specifically, the base station needs to notify, by using the first-type DCI signaling, the user equipment of the location of the PRB pair at which the second measurement pilot is located.

For example, the base station notifies, by using the first-type DCI signaling, that a location of a PRB pair at which a second measurement pilot of UE3 is located is the PRB pair 1, and a port number in this PRB pair is 16.

For another example, the base station notifies, by using the first-type DCI signaling, that a location of a PRB pair at which a second measurement pilot of UE4 is located is the PRB pair 2, and a port number in this PRB pair is 15.

A manner in which the base station notifies another user equipment of the second measurement pilot is not elaborated.

In a specific application process, if a quantity of user equipments UEs is excessively large, for example, UEi, UEj, UEm, and UEn, each UE needs to be notified by using such signaling. An advantage of using a manner of notifying the second measurement pilot by using the first-type DCI lies in that each UE may clearly know information about a second measurement pilot of the UE. Therefore, information (time domain information and frequency domain information) about a channel that the UE needs to measure may be measured in a more precise manner. For example, UE1 knows that UE1 needs to measure channels of only a PRB pair 1 and a PRB pair 2.

The first-type DCI may have a size the same as that of one DCI format of DCI formats of a DL grant or a UL grant in the transmission mode. However, different RNTIs are used to perform scrambling.

Another application scenario is used below to describe an example of how the user equipment receives the second measurement pilot.

The base station may configure the second measurement pilot by using second-type DCI signaling.

The second-type DCI signaling is not DCI signaling specially used to configure the second measurement pilot, but instead, carries information for data scheduling. If the second-type DCI signaling is sent in an $(n-X)^{th}$ subframe, data scheduled by using the second-type DCI signaling is sent in the $n^{th}$ subframe.

The second-type DCI signaling is signaling for scheduling data, and therefore definitely includes resource allocation information of the data. The resource allocation information indicates PRB pairs, for example, a PRB pair 1, a PRB pair 3, and a RPB pair i, in which the data is to be scheduled. In this case, these PRB pairs are PRB pairs at which the second measurement pilot is located. That is, the resource allocation information in the second-type DCI indicates both resource allocation of the data and a frequency domain location of the second measurement pilot.

When the manner of the second measurement pilot shown in this application scenario is used, the base station does not need to add extra signaling to notify the frequency domain information of the second measurement pilot.

How the user equipment determines port information of the second measurement pilot is described below.

If a port number of the user equipment and a port number of user equipment paired with the user equipment are notified in each subband, excessively high signaling overheads are needed.

For example, as shown in FIG. 4, UE1 in the PRB pair 1 uses a port port 15, and UE3 paired with UE1 uses the port 16.

UE1 in the PRB pair 2 uses the port 16, and UE4 paired with UE1 uses the port 15. A manner in which a port number of UE and a port number of UE paired with the UE may be known in an implicit manner is specifically: Assuming a pattern of a fixed second measurement pilot and assuming that at most two user equipments are paired, only two CSI-RS ports are needed in each PRB pair. It is assumed that the two ports are the port 15 and the port 16.

The first user equipment UE1 first assumes that the port 15 is a signal and the port 16 is an interference, and performs measurement to obtain a signal-to-noise ratio SINR1. UE1 then assumes that the port 16 is a signal and the port 15 is an interference, and performs measurement to obtain an SINR2. UE1 reports the SINR1 and the SINR2 in a PRB pair allocated to each resource, or reports an index of a selected port port corresponding to a larger SINR, and reports the SINR corresponding to the port.

The base station may determine the port information of the second measurement pilot according to the index of the port port and the corresponding SINR that are reported by UE1, and notify the user equipment of the determined port information of the second measurement pilot.

To improve accuracy in a data transmission process, the user equipment in the data transmission method according to the present invention can perform measurement of a measurement pilot by using a limitative measurement manner, so that the user equipment can improve accuracy of measurement, and reflect an actual signal to the base station.

In the data transmission method according to the present invention, one measurement process includes M signal measurement pilots and K interference measurement pilots.

M is an integer greater than or equal to 1, and K is an integer greater than 1.

That is, the second measurement pilot in this embodiment includes M signal measurement pilots and K interference measurement pilots.

Specifically, the K interference measurement pilots use independent configurations of limitative measurement; and/or the M signal measurement pilots use independent configurations of limitative measurement.

The limitative measurement is to limit a moving average range of resources that are allowed to be measured.

How the user equipment in this embodiment specifically performs limitative measurement is described below with reference to FIG. 5.

In this embodiment, a trigger reason of using the limitative measurement may be: A beam direction of the measurement pilot sent by the base station to the user equipment is changed, and if the user equipment performs channel measurement according to the pilot whose beam direction is changed, an average signal-to-noise ratio SNR fed back by the user equipment to the base station by using CSI is not accurate.

Figures 5, 6:
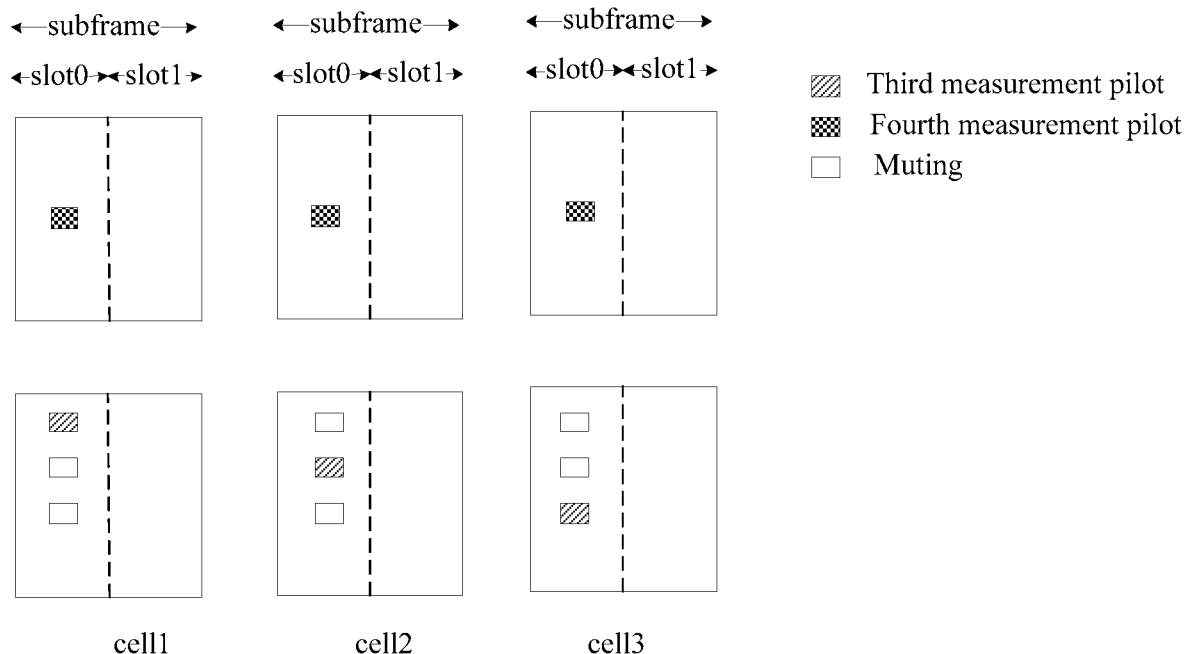
FIG. 5 is a schematic diagram of another embodiment of a data transmission scenario according to an embodiment of the present invention.
FIG. 6 is a schematic diagram of another embodiment of a data transmission scenario according to an embodiment of the present invention.

In view of this, FIG. 5 is used as an example to describe how the user equipment implements accurate interference measurement if the beam direction is changed.

In this embodiment, a change, with time, of a beam direction of first user equipment UE1 in a first cell cell1 is shown in FIG. 4. That is, from a moment t0 to a moment t3, a beam is B0, from a moment t4 to a moment t6, a beam is B4, and from a moment t7 to a moment t12, a beam is B0.

For other user equipments, changes of beams are different. Second user equipment UE2 that is in a same cell as UE1 is used as an example. A change of a beam of UE2 is shown in FIG. 4. That is, from the moment t0 to the moment t3, a beam is B1, from the moment t4 to a moment t5, a beam is B2, and from the moment t6 to a moment t12, a beam is B1. Refer to FIG. 5 for a change of a beam of UE3 and a change of a beam of UE4. Details are not described herein.

If UE1 and UE2 need to be paired in a data transmission process, as shown in FIG. 5, at the moment t4, the base station sends, to UE1, a second measurement pilot using B4, and the base station sends, to UE2, a measurement pilot using B2. It is assumed that the base station needs to pair up UE1 and UE2 at a moment after the moment t4, an instantaneous interference from UE2 to UE1 needs to be known. Time windows for the base station to measure a signal of UE1 are t4, t5, and t6. Therefore, in the time windows, the beam of UE1 does not change.

Time windows for the base station to measure an instantaneous interference from UE2 to UE1 are t4 and t5. Therefore, in the time windows, the beam of UE2 does not change.

A time window for the base station to measure a randomized interference may have any length or may not perform limitative measurement.

A measurement resource for measuring the instantaneous interference and a measurement resource for measuring the randomized interference are different.

For example, M signal measurement pilots and K interference measurement pilots are configured in one measurement process CSI process.

For example, the M signal measurement pilots are an NZP CSI-RS resource m0, an NZP CSI-RS resource m1, . . . , and an NZP CSI-RS resource mM−1. A configuration of each NZP (non-zero power) CSI-RS resource m0 includes a quantity of ports and a time-frequency resource location of the NZP CSI-RS resource m0.

The user equipment can perform synthesis according to M1 signals in measurement of M signals that are measured according to the M signal measurement pilots, to determine one CQI, where M1 is an integer greater than 1 and less than or equal to M.

Optionally, the K interference measurement pilots may be all non-zero power pilots or all zero power pilots, or the K interference measurement pilots include a non-zero power pilot and a zero power pilot.

The K interference measurement pilots are an NZP CSI-RS resource k0, an NZP CSI-RS resource k1, . . . , and an NZP CSI-RS resource kK−1.

Alternatively, the K interference measurement pilots are a ZP (zero power zero power) CSI-RS resource k0, a ZP CSI-RS resource k1, . . . , and a ZP CSI-RS resource kK.

Alternatively, the K interference measurement pilots are K1 ZP CSI-RS resources, that is, a ZP (zero power zero power) CSI-RS resources k0, a ZP CSI-RS resource k1, . . . , and a ZP CSI-RS resource kK1−1, and K2 NZP CSI-RS resources, that is, an NZP CSI-RS resource k K1, a ZP CSI-RS resource k1, . . . , and a ZP CSI-RS resource kK−1.

At least one of the K interference measurement pilots is configured in such a way that limitative measurement for performing interference measurement is disabled.

The user equipment can perform synthesis according to measurement amounts of K1 interferences of K interferences that are measured according to the K interference measurement pilots, to determine one CQI, where K1 is an integer greater than 1 and less than or equal to K.

Interferences measured according to the K interference measurement pilots are different types of interferences. Therefore, limitative measurement of the K interference measurement pilots may have K independent configurations. For example, for UE1, when K=2, as shown in FIG. 5, for example, an NZP CSI-RS resource k0 and an NZP CSI-RS resource k1 are used to measure an interference. Therefore, the NZP CSI-RS resource k0 corresponds to measurement of a first-type interference (or the instantaneous interference). Short-time limitative measurement needs to be performed for the first-type interference. For example, interferences in a same cell are measured. UE2 and UE1 both belong to cell1. Therefore, it is configured that a time window of limitative measurement of the NZP CSI-RS resource k0 is t4 to t5 (t4 to t5), to measure an interference from a beam B2 of UE2 to a beam B4 of UE1. Interferences, to UE1, from a signal sent by cell2 to UE3 and a signal sent by cell3 to UE4 are inter-cell interferences. Such interferences are randomized interferences. A long time of averaging is needed to obtain a randomized interference. Therefore, the NZP CSI-RS resource k1 is used to correspondingly measure a second-type interference, that is, the randomized interference. The second-type interference may use a time window of limitative measurement having a relatively large window length, or limitative measurement for the NZP CSI-RS resource k1 is disabled.

The independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the independent configurations of the signaling types of the limitative measurement include that the limitative measurement is configured independently by using higher layer signaling or dynamic signaling, where the dynamic signaling is notified by using UL grant signaling or DL grant signaling.

Optionally, the independent configurations of the signaling types of the limitative measurement include that the limitative measurement is configured independently by using higher layer signaling or dynamic signaling, where the dynamic signaling is notified by using UL grant signaling or DL grant signaling.

To implement interference and signal measurement by the user equipment, pilots of N ports are configured in the measurement process, where pilots of N1 ports are used to measure a signal, and the pilots of all the N ports are used to measure an interference.

Alternatively, one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Alternatively, one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

A specific application scenario is used to provide detailed description below. In this application scenario, pilots used for signal measurement in the second measurement pilot are generally referred to as third pilots, and pilots used for interference measurement in the second measurement pilot are generally referred to as fourth pilots.

As shown in FIG. 6, fourth measurement pilots that are configured by the base station in all cells or that are predefined have a same time-frequency resource location.

A third measurement pilot has staggered time-frequency resource locations in at least two cells.

For example, time-frequency resources of fourth measurement pilots of cell1, cell2, and cell3 are aligned. Cell2 and cell3 are muted at a time-frequency resource location at which cell1 sends a third measurement pilot. That is, the base station does not send a signal at a location the same as a time-frequency resource location at which cell1 sends the third measurement pilot.

Because the base station does not send a signal at the location the same as the time-frequency resource location at which cell1 sends the third measurement pilot, interferences from cell2 and cell3 to the third measurement pilot sent by cell1 may be avoided, so that a signal measured by using the third measurement pilot of cell1 is more accurate.

Moreover, cell1 and cell3 are muted, that is, do not send a signal, at a time-frequency resource location at which cell2 sends a third measurement pilot. Therefore, an interference to the third measurement pilot sent by cell2 may be avoided. In this way, a signal obtained by measurement by using the third measurement pilot is highly accurate.

All cells send signals in a fourth measurement pilot. Therefore, interferences from all the cells to a current cell may be obtained by measurement in the fourth measurement pilot. That is, a signal RB received in the fourth measurement pilot equals S+I, where S is a signal of the current cell, and I is an interference of another cell. For an interference from another cell in a third measurement pilot, the interference of the another cell cannot be received because of muting. Therefore, the signal RA received in the third measurement pilot equals S. Therefore, by using RB−RA=I, a relatively accurate interference I may be obtained.

An example of how the user equipment performs signal measurement and performs interference measurement according to the second measurement pilot is described in the foregoing, but does not constitute a limitation. The following manner may be further used to perform signal measurement and interference measurement.

Figure 7:
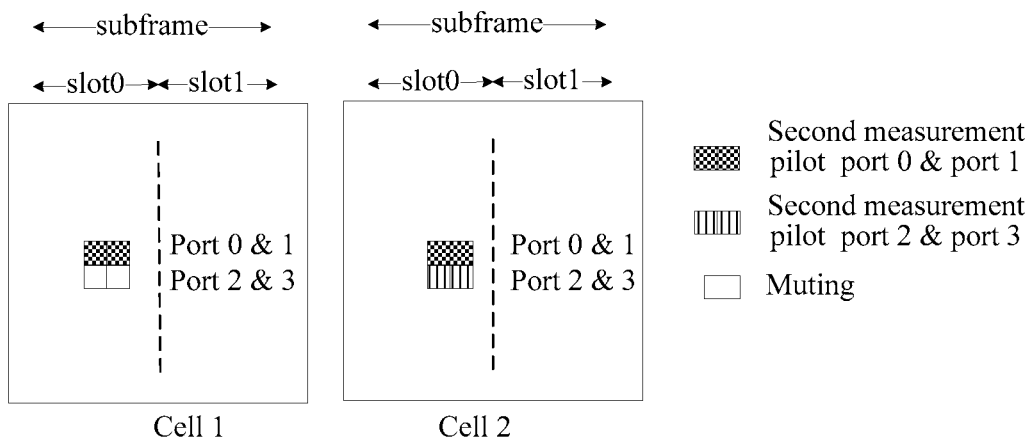
FIG. 7 is a schematic diagram of another embodiment of a data transmission scenario according to an embodiment of the present invention.

As shown in FIG. 7, an example in which second measurement pilots of all cells have a same time-frequency resource location and a same quantity of ports is used.

To implement precise interference and signal measurement by the user equipment, when the user equipment calculates the CQI, the user equipment determines that a ratio of a signal measurement power of each pilot port to a power of data is X, where X is related to a quantity of frequency division multiplexing subcarriers of the N ports or is fixed.

When calculating the CQI, the user equipment determines that a ratio of an interference measurement power of each pilot port to a power of an interference of data received by the user equipment is Y, where Y is related to a quantity of frequency division multiplexing subcarriers of the N ports or is fixed.

The ratio X of a signal measurement power of each pilot port to a power of data is equal to the ratio Y of an interference measurement power of each pilot port to a power of an interference of data received by the user equipment.

For example, as shown in FIG. 7, four ports are used for all second measurement pilots. For example, two same resource elements REs are used for a port 0 and a port 1, and a code division multiplexing manner is used. For example, the port 0 uses an OCC code (1, 1), and the port 1 uses an OCC code (1, −1). Similarly, two same REs are used for a port 2 and a port 3, and a code division multiplexing manner is used. For example, the port 2 uses the OCC code (1, 1), and the port 3 uses the OCC code (1, −1).

As shown in FIG. 7, when a current cell sends two-layer data, used ports of a second measurement pilot are the port 0 and the port 1. When a neighboring cell sends four-layer data, the port 0, the port 1, the port 2, and the port 3 are used for a second measurement pilot sent by the neighboring cell.

To enable the user equipment to accurately measure an interference, the base station ensures that a ratio of a power of each port of a second measurement pilot to a power of each layer of transmitted data is 2, that is, 3 dB.

UE1 is a user of cell1. A signal R1 received by UE1 in the port 0 and the port 1 equals $S+2I_1+\sigma^2$, where S is a signal measured by UE1, a measured interference and noise are $2I_1+\sigma^2$, and $\sigma^2$ is a noise.

$I_1$ in $2I_1$ is an assumed interference to first two layers, that is, a layer 0 and a layer 1, of data of an interfering user. Because a ratio of a power of each port of a second measurement pilot to a power of each layer of transmitted data is 2, a measured interference is $2I_1$.

A signal R2 received in the port 2 and the port 3 equals $2I_1+\sigma^2$. $I_2$ in $2I_2$ is an assumed interference to last two layers, that is, a layer 2 and a layer 3, of the data of the interfering user.

A measured total interference may be obtained by using the following manner:

$$I = \frac{R_1 - S + R_2}{2} = \frac{2I_1 + 2I_2 + 2\sigma^2}{2} = I_1 + I_2 + \sigma^2.$$

This is the reason why the base station needs a power difference between a measurement pilot and data, that is, the power of the measurement pilot is twice as large as that of the data, so that an accurate interference and noise $I_1+I_2+\sigma^2$ can be obtained. If it is assumed that the power of the measurement pilot is not twice as large as that of the data in the foregoing, $I=I_1+I_2+2\sigma^2$, and interference measurement is not accurate.

As can be seen, the second measurement pilot is transmitted in at least two frequency-division resources. If the second measurement pilot is transmitted by using N frequency-division resources, a ratio of a power of each second measurement pilot port to a power of data is N, and $$I = \frac{NI_1 + NI_2 + N\sigma^2}{N} = I_1 + I_1 + \sigma^2.$$

Figure 8:
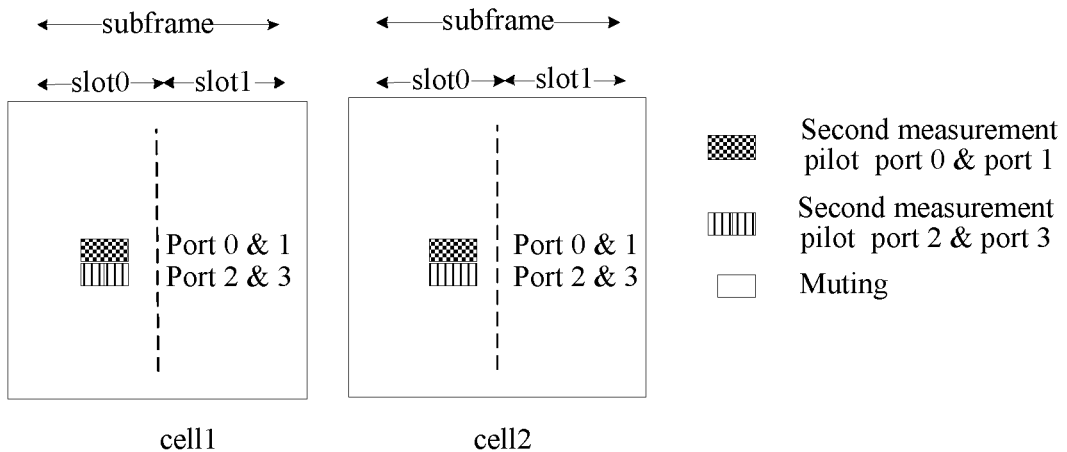
FIG. 8 is a schematic diagram of another embodiment of a data transmission scenario according to an embodiment of the present invention.

For the manner in FIG. 8, when four-layer data is sent in a current cell, used ports of a second measurement pilot are the port 0 and the port 1. When a neighboring cell sends four-layer data, the port 0, the port 1, the port 2, and the port 3 are used for a second measurement pilot sent by the neighboring cell. In this case, it is ensured that a ratio of a power of each port of the second measurement pilot to a power of each layer of transmitted data is 2, that is, 3 dB.

UE1 is a user of cell1. A signal R1 received by UE1 in the port 0 and the port 1 equals $S+2I_1+\sigma^2$, where S is a signal measured by the UE, a measured interference and noise are $2I_1+\sigma^2$, and $\sigma^2$ is a noise.

$I_1$ in $2I_1$ is an assumed interference to first two layers, that is, a layer 0 and a layer 1, of the data of the interfering user. Because the power of the measurement pilot is twice as large as the power of the data, the measured interference is $2I_1$. A signal R2 received in the port 2 and the port 3 equals $S+2I_1+\sigma^2$. $I_2$ in $2I_2$ is an assumed interference to the last two layers, that is, a layer 2 and a layer 3, of the data of the interfering user. In this case, a measured total interference may be obtained by using the following manner:

$$I = \frac{R_1 - S + R_2 - S}{2} = \frac{2I_1 + 2I_2 + 2\sigma^2}{2} = I_1 + I_2 + \sigma^2.$$

As can be seen, a power difference exists between a pilot and data, that is, the power of the pilot is twice as large as the power of the data, so that an accurate interference and noise $I_1+I_2+\sigma^2$ can be obtained. If it is assumed that the power of the pilot is not twice as large as the power of the data in the foregoing, $I=I_1+I_2+2\sigma^2$, and interference measurement is not accurate.

The second measurement pilot is transmitted by using at least two frequency-division resources. If the second measurement pilot is transmitted by using N frequency-division resources, a ratio of a power of each port of the second type measurement pilot to a power of data is N, and $$I = \frac{NI_1 + NI_2 + N\sigma^2}{N} = I_1 + I_1 + \sigma^2.$$

Figure 9:
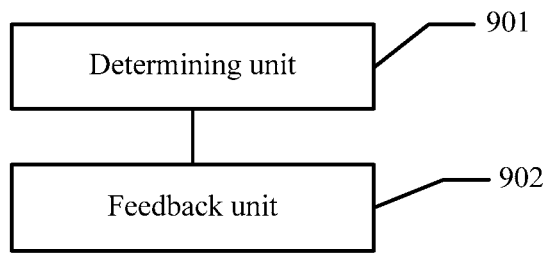
FIG. 9 is a schematic structural diagram of user equipment according to an embodiment of the present invention.

A specific structure of user equipment according to an embodiment of the present invention is described below in detail with reference to the embodiment shown in FIG. 9.

The user equipment includes:

a determining unit 901, configured to determine a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and a feedback unit 902, configured to perform measurement and feedback according to the determined measurement procedure and/or the determined type of the fed-back CSI.

In this embodiment of the present invention, user equipment can determine different measurement processes and different types of fed-back channel state information CSI according to different types of measurement processes, so that a user can feed back more accurate downlink channel information to a base station according to the different measurement processes and different types of fed-back channel state information CSI, thereby improving performance of data transmission between the base station and the user equipment.

Figure 10:
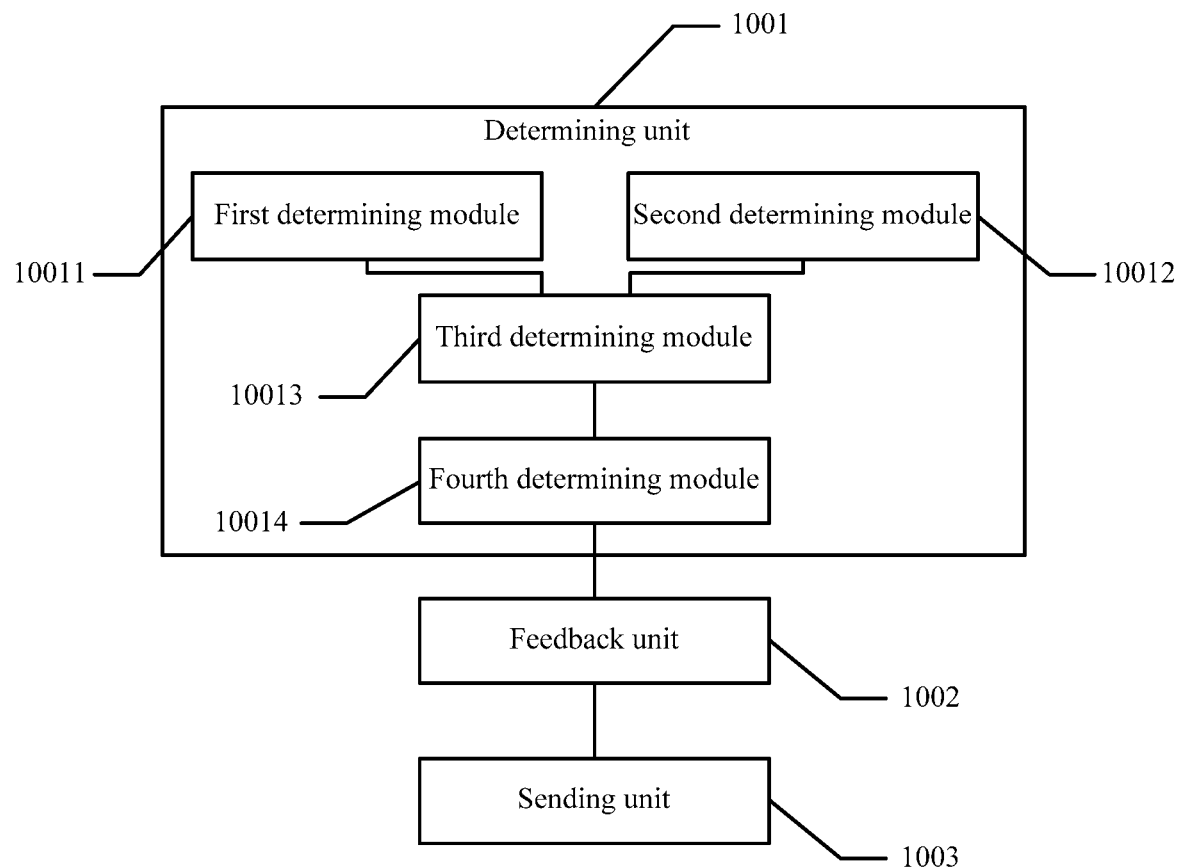
FIG. 10 is another schematic structural diagram of user equipment according to an embodiment of the present invention.

A specific structure of the user equipment is further described below in detail with reference to FIG. 10.

The user equipment includes:

a determining unit 1001, configured to determine a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI; and a feedback unit 1002, configured to perform measurement and feedback according to the determined measurement procedure and/or the determined type of the fed-back CSI.

The determining unit 1001 includes:

a first determining module 10011, configured to: if the signal measurement pilot defined in the measurement process is a first measurement pilot, determine that the type of the fed-back CSI is first CSI; or a second determining module 10012, configured to: if the signal measurement pilot defined in the measurement process is a second measurement pilot, determine that the type of the fed-back CSI is second CSI, where a feedback amount included in the first CSI and a feedback amount included in the second CSI are different.

Optionally, the first measurement pilot determined by the first determining module 10011 is a non-precoded pilot or a precoded pilot, and/or the first measurement pilot is a periodically sent pilot; and the second measurement pilot determined by the second determining module 10012 is a precoded pilot, and/or the second measurement pilot is not sent periodically, and/or the second measurement pilot is triggered by the base station, and/or the second measurement pilot is sent in a subband.

Optionally, the first CSI determined by the first determining module 10011 includes a rank indication RI, a precoding matrix indication PMI, and a channel quality indication CQI, or the first CSI includes an RI and a PMI; and the second CSI determined by the second determining module 10012 includes an RI, a PMI, and a CQI, or the second CSI includes a CQI, or the second CSI includes an index BI that indicates a selected beam, an RI, and a CQI.

Optionally, the determining unit 1001 is further configured to determine that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the determining unit 1001 is further configured to determine that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the determining unit 1001 is further configured to determine that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the determining unit 1001 further includes:

a third determining module 10013, configured to perform synthesis according to measurement amounts of K1 interferences of K interferences that are measured according to the K interference measurement pilots, to determine one CQI, where K1 is an integer greater than 1 and less than or equal to K; and a fourth determining module 10014, configured to perform synthesis according to M1 signals in measurement of M signals that are measured according to the M signal measurement pilots, to determine one CQI, where M1 is an integer greater than 1 and less than or equal to M.

Optionally, the determining unit 1001 determines that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the determining unit 1001 is further configured to determine that the K interference measurement pilots are all non-zero power pilots or are all zero power pilots, or the K interference measurement pilots include a non-zero power pilot and a zero power pilot.

Optionally, the determining unit 1001 is further configured to determine that at least one of the K interference measurement pilots is configured in such a way that limitative measurement for performing interference measurement is disabled.

Optionally, the determining unit 1001 is further configured to determine that pilots of N ports are configured in the measurement process, where pilots of N1 ports are used to measure a signal, and the pilots of all the N ports are used to measure an interference.

Optionally, the determining unit 1001 is further configured to determine that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the determining unit 1001 is further configured to determine that one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, the determining unit 1001 is further configured to: when determining to calculate the CQI, determine, by the user equipment, that a ratio of a signal measurement power of each pilot port to a power of data is X, where X is related to a quantity of frequency division multiplexing subcarriers of the N ports or is fixed.

Optionally, the determining unit 1001 is further configured to: when determining to calculate the CQI, determine, by the user equipment, that a ratio of an interference measurement power of each pilot port to a power of an interference of data received by the user equipment is Y, where Y is related to a quantity of frequency division multiplexing subcarriers of the N ports or is fixed.

Optionally, the determining unit 1001 is further configured to determine that the ratio X of a signal measurement power of each pilot port to a power of data is equal to the ratio Y of an interference measurement power of each pilot port to a power of an interference of data received by the user equipment.

Optionally, the determining unit 1001 is further configured to determine that a time-frequency resource location of the second measurement pilot is in a first slot of a subframe.

Optionally, the user equipment further includes a sending unit 1003.

The sending unit 1003 is configured to feed back the second CSI in a second slot of the subframe at which the second measurement pilot is located.

Optionally, the determining unit 1001 is further configured to determine that a time interval from a reference resource of the second CSI that is obtained by measurement according to the second measurement pilot to a reporting moment is X1, and a time interval from a reference resource of the first CSI that is obtained by measurement according to the first measurement pilot to a reporting moment is X2, where X1<X2, and the reference resource is a subframe used to send the second measurement pilot.

Optionally, the determining unit 1001 is further configured to determine that a time interval from a reference resource of the second CSI that is obtained by measurement according to the second measurement pilot to a reporting moment is X1, where X1 is configured by using higher layer signaling or is configured by using dynamic signaling, and the reference resource is a subframe used to send the second measurement pilot.

Optionally, the determining unit 1001 is further configured to determine that a time interval from a reference resource of measurement according to the second measurement pilot to a reporting moment is X1, where X1 is related to a quantity of resources of the second measurement pilot that are included in one measurement procedure and/or a quantity of ports included in each second measurement pilot, and the reference resource is a subframe used to send the second measurement pilot.

For how the user equipment shown in this embodiment specifically performs the data transmission method, refer to the embodiments shown in FIG. 1 to FIG. 8 for details. A specific performing process is not described in this embodiment again.

Figure 11:
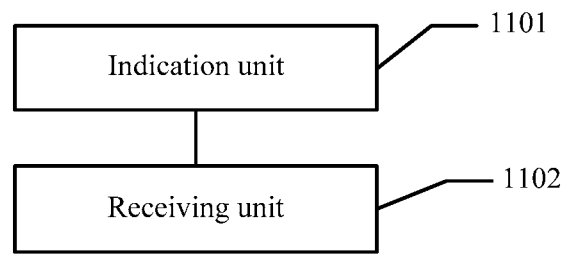
FIG. 11 is a schematic structural diagram of a base station according to an embodiment of the present invention.

A specific structure of the base station is described below in detail with reference to FIG. 11.

The base station includes:

an indication unit 1101, configured to indicate a type of a measurement process to user equipment, where the type of the measurement process is used to enable the user equipment to determine, according to the type of the measurement process, a measurement procedure and a type of fed-back channel state information CSI, the type of the measurement process includes a definition of a signal measurement pilot and a definition of an interference measurement pilot, and different types of measurement processes correspond to different measurement procedures and/or different types of fed-back channel state information CSI; and a receiving unit 1102, configured to receive a feedback sent by the user equipment, where the feedback is generated by the user equipment according to the determined measurement procedure and/or fed-back CSI.

In this embodiment of the present invention, user equipment can determine different measurement processes and different types of fed-back channel state information CSI according to different types of measurement processes, so that a user can feed back more accurate downlink channel information to a base station according to the different measurement processes and different types of fed-back channel state information CSI, thereby improving performance of data transmission between the base station and the user equipment.

Figure 12:
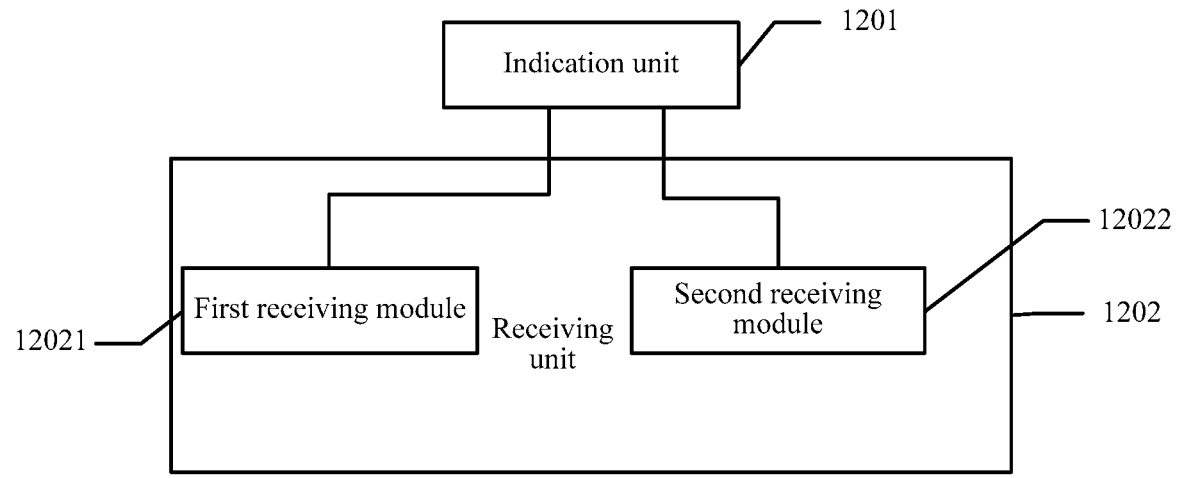
FIG. 12 is another schematic structural diagram of a base station according to an embodiment of the present invention.

A structure of the base station is further described below in detail with reference to FIG. 12.

The base station includes:

an indication unit 1201, configured to indicate a type of a measurement process to user equipment, where the type of the measurement process is used to enable the user equipment to determine, according to the type of the measurement process, a measurement procedure and a type of fed-back channel state information CSI, the type of the measurement process includes a definition of a signal measurement pilot and a definition of an interference measurement pilot, and different types of measurement processes correspond to different measurement procedures and/or different types of fed-back channel state information CSI; and a receiving unit 1202, configured to receive a feedback sent by the user equipment, where the feedback is generated by the user equipment according to the determined measurement procedure and/or fed-back CSI.

The receiving unit 1202 includes:

a first receiving module 12021, configured to: if the signal measurement pilot defined in the measurement process is a first measurement pilot, receive CSI that is sent by the user equipment and whose type is first CSI; or a second receiving module 12022, configured to: if the signal measurement pilot defined in the measurement process is a second measurement pilot, receive CSI that is sent by the user equipment and whose type is second CSI, where a feedback amount included in the first CSI and a feedback amount included in the second CSI are different.

Optionally, the indication unit 1201 is further configured to indicate that the first measurement pilot is a non-precoded pilot or a precoded pilot, and/or the first measurement pilot is a periodically sent pilot; and the second measurement pilot is a precoded pilot, and/or the second measurement pilot is not sent periodically, and/or the second measurement pilot is triggered by the base station, and/or the second measurement pilot is sent in a subband.

Optionally, the first CSI received by the receiving unit 1202 includes a rank indication RI, a precoding matrix indication PMI, and a channel quality indication CQI, or the first CSI includes an RI and a PMI.

The second CSI received by the receiving unit 1202 includes an RI, a PMI, and a CQI, or the second CSI includes a CQI, or the second CSI includes an index BI that indicates a selected beam, an RI, and a CQI.

Optionally, the indication unit 1201 is further configured to indicate that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the indication unit 1201 is further configured to indicate that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the indication unit 1201 is further configured to indicate that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the receiving unit 1202 is further configured to receive a CQI sent by the user equipment, where the CQI is one CQI determined by the user equipment by performing synthesis according to measurement amounts of K1 interferences of K interferences that are measured according to the K interference measurement pilots, where K1 is an integer greater than 1 and less than or equal to K.

Optionally, the receiving unit 1202 is further configured to receive a CQI sent by the user equipment, where the CQI is one CQI determined by the user equipment by performing synthesis according to M1 signals in measurement of M signals that are measured according to the M signal measurement pilots, where M1 is an integer greater than 1 and less than or equal to M.

Optionally, the indication unit 1201 is further configured to indicate that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the indication unit 1201 is further configured to indicate that the K interference measurement pilots are all non-zero power pilots or are all zero power pilots, or the K interference measurement pilots include a non-zero power pilot and a zero power pilot.

Optionally, the indication unit 1201 is further configured to indicate that at least one of the K interference measurement pilots is configured in such a way that limitative measurement for performing interference measurement is disabled.

Optionally, the indication unit 1201 is further configured to indicate that pilots of N ports are configured in the measurement process, where pilots of N1 ports are used to measure a signal, and the pilots of all the N ports are used to measure an interference.

Optionally, the indication unit 1201 is further configured to indicate that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the indication unit 1201 is further configured to indicate that one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, the indication unit 1201 is further configured to indicate that a ratio X of a signal measurement power of each pilot port to a power of data is equal to a ratio Y of an interference measurement power of each pilot port to a power of an interference of data received by the user equipment.

Optionally, the indication unit 1201 is further configured to indicate that a time-frequency resource location of the second measurement pilot is in a first slot of a subframe.

Optionally, the receiving unit 1202 is further configured to receive, in a second slot of the subframe at which the second measurement pilot is located, a feedback of the second CSI sent by the user equipment.

Optionally, the indication unit 1201 is further configured to: determine a time interval X1, where X1 is a time interval from a reference resource of the second CSI that is obtained by measurement by the user equipment according to the second measurement pilot to a reporting moment; and determine a time interval X2, where X2 is a time interval from a reference resource of the first CSI that is obtained by measurement by the user equipment according to the first measurement pilot to a reporting moment.

X1<X2, and the reference resource is a subframe used to send the second measurement pilot.

Optionally, the indication unit 1201 is further configured to determine a time interval X1, where X1 is a time interval from a reference resource of the second CSI that is obtained by measurement by the user equipment according to the second measurement pilot to a reporting moment, where X1 is configured by using higher layer signaling or is configured by using dynamic signaling, and the reference resource is a subframe used to send the second measurement pilot.

Optionally, the indication unit 1201 is further configured to determine a time interval X1, where X1 is a time interval from a reference resource of the second CSI that is obtained by measurement by the user equipment according to the second measurement pilot to a reporting moment, X1 is related to a quantity of resources of the second measurement pilot that are included in one measurement procedure and/or a quantity of ports included in each second measurement pilot, and the reference resource is a subframe used to send the second measurement pilot.

Specifically, for how the base station performs the data transmission method, refer to the embodiments shown in FIG. 1 to FIG. 8 for details. Details are not described in this embodiment again.

A specific structure of user equipment is described below from the perspective of hardware with reference to FIG. 13.

Figure 13:
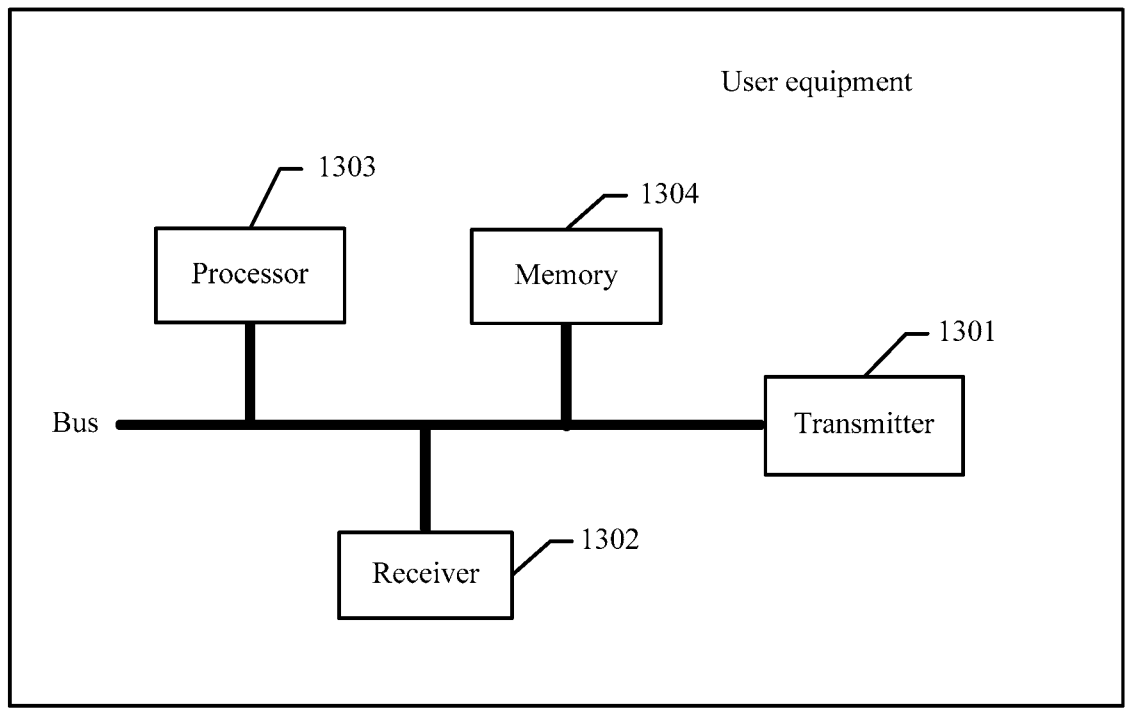
FIG. 13 is another schematic structural diagram of user equipment according to an embodiment of the present invention.

As shown in FIG. 13, the user equipment includes: a transmitter 1301, a receiver 1302, a processor 1303, and a memory 1304. There may be one or more processors 1303. In this embodiment, one processor 1303 is used as an example for description.

In this embodiment, the transmitter 1301, the receiver 1302, the memory 1304, and the processor 1303 are connected by using a bus. Certainly, another connection manner may also be used. A specific connection manner is not limited in this embodiment.

The user equipment in this embodiment of the present invention may have more or fewer components than those shown in FIG. 13. Two or more components may be combined, or configurations or settings of the components may be different, and the components may be implemented in hardware, software, or a combination of hardware and software that includes one or more signal processing and/or application-specific integrated circuits.

The processor 1303 is configured to determine a measurement procedure and a type of fed-back channel state information CSI according to a type of a measurement process, where the type of the measurement process includes a definition of a signal measurement pilot and a definition of an interference measurement pilot, and different types of measurement processes correspond to different measurement procedures and/or different types of fed-back channel state information CSI.

The transmitter is configured to perform measurement and feedback according to the determined measurement procedure and/or the determined type of the fed-back CSI.

Optionally, the transmitter is configured to: if the signal measurement pilot defined in the measurement process is a first measurement pilot, determine that the type of the fed-back CSI is first CSI.

Alternatively, the transmitter 1301 is configured to: if the signal measurement pilot defined in the measurement process is a second measurement pilot, determine that the type of the fed-back CSI is second CSI, where a feedback amount included in the first CSI and a feedback amount included in the second CSI are different.

Optionally, the processor 1303 is configured to determine that the first measurement pilot is a non-precoded pilot or a precoded pilot, and/or the first measurement pilot is a periodically sent pilot.

The processor 1303 is configured to determine that the second measurement pilot is a precoded pilot, and/or the second measurement pilot is not sent periodically, and/or the second measurement pilot is triggered by the base station, and/or the second measurement pilot is sent in a subband.

Optionally, the processor 1303 is configured to determine that the first CSI includes a rank indication RI, a precoding matrix indication PMI, and a channel quality indication CQI, or the first CSI includes an RI and a PMI.

The second CSI includes an RI, a PMI, and a CQI, or the second CSI includes a CQI, or the second CSI includes an index BI that indicates a selected beam, an RI, and a CQI.

Optionally, the processor 1303 is configured to determine that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the processor 1303 is configured to determine that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the processor 1303 is configured to determine that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the processor 1303 is configured to determine that synthesis is performed according to measurement amounts of K1 interferences of K interferences that are measured according to the K interference measurement pilots, to determine one CQI, where K1 is an integer greater than 1 and less than or equal to K.

Optionally, the processor 1303 is configured to determine that synthesis is performed according to M1 signals in measurement of M signals that are measured according to the M signal measurement pilots, to determine one CQI, where M1 is an integer greater than 1 and less than or equal to M.

Optionally, the processor 1303 is configured to determine that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the processor 1303 is configured to determine that the K interference measurement pilots are all non-zero power pilots or are all zero power pilots, or the K interference measurement pilots include a non-zero power pilot and a zero power pilot.

Optionally, the processor 1303 is configured to determine that at least one of the K interference measurement pilots is configured in such a way that limitative measurement for performing interference measurement is disabled.

Optionally, the processor 1303 is configured to determine that pilots of N ports are configured in the measurement process, where pilots of N1 ports are used to measure a signal, and the pilots of all the N ports are used to measure an interference.

Optionally, the processor 1303 is configured to determine that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the processor 1303 is configured to determine that one measurement pilot including N ports is configured in the measurement process, where pilots of N1 ports are used to measure a signal, pilots of (N−N1) ports are used to measure an interference, N is an integer greater than 1, and N1 is an integer greater than or equal to 1 and less than or equal to N.

Optionally, the processor 1303 is configured to: when the user equipment calculates the CQI, determine, by the user equipment, that a ratio of a signal measurement power of each pilot port to a power of data is X, where X is related to a quantity of frequency division multiplexing subcarriers of the N ports or is fixed.

Optionally, the processor 1303 is configured to: when the user equipment calculates the CQI, determine, by the user equipment, that a ratio of an interference measurement power of each pilot port to a power of an interference of data received by the user equipment is Y, where Y is related to a quantity of frequency division multiplexing subcarriers of the N ports or is fixed.

Optionally, the processor 1303 is configured to determine that the ratio X of a signal measurement power of each pilot port to a power of data is equal to the ratio Y of an interference measurement power of each pilot port to a power of an interference of data received by the user equipment.

Optionally, the processor 1303 is configured to determine that a time-frequency resource location of the second measurement pilot is in a first slot of a subframe.

Optionally, the processor 1303 is configured to determine that feedback of the second CSI is performed in a second slot of the subframe at which the second measurement pilot is located.

Optionally, the processor 1303 is configured to determine that a time interval from a reference resource of the second CSI that is obtained by measurement according to the second measurement pilot to a reporting moment is X1, and a time interval from a reference resource of the first CSI that is obtained by measurement according to the first measurement pilot to a reporting moment is X2, where X1<X2, and the reference resource is a subframe used to send the second measurement pilot.

Optionally, the processor 1303 is configured to determine that a time interval from a reference resource of the second CSI that is obtained by measurement according to the second measurement pilot to a reporting moment is X1, where X1 is configured by using higher layer signaling or is configured by using dynamic signaling, and the reference resource is a subframe used to send the second measurement pilot.

Optionally, the processor 1303 is configured to determine that a time interval from a reference resource of measurement according to the second measurement pilot to a reporting moment is X1, where X1 is related to a quantity of resources of the second measurement pilot that are included in one measurement procedure and/or a quantity of ports included in each second measurement pilot, and the reference resource is a subframe used to send the second measurement pilot.

A specific structure of a base station is described below from the perspective of hardware with reference to FIG. 14.

Figure 14:
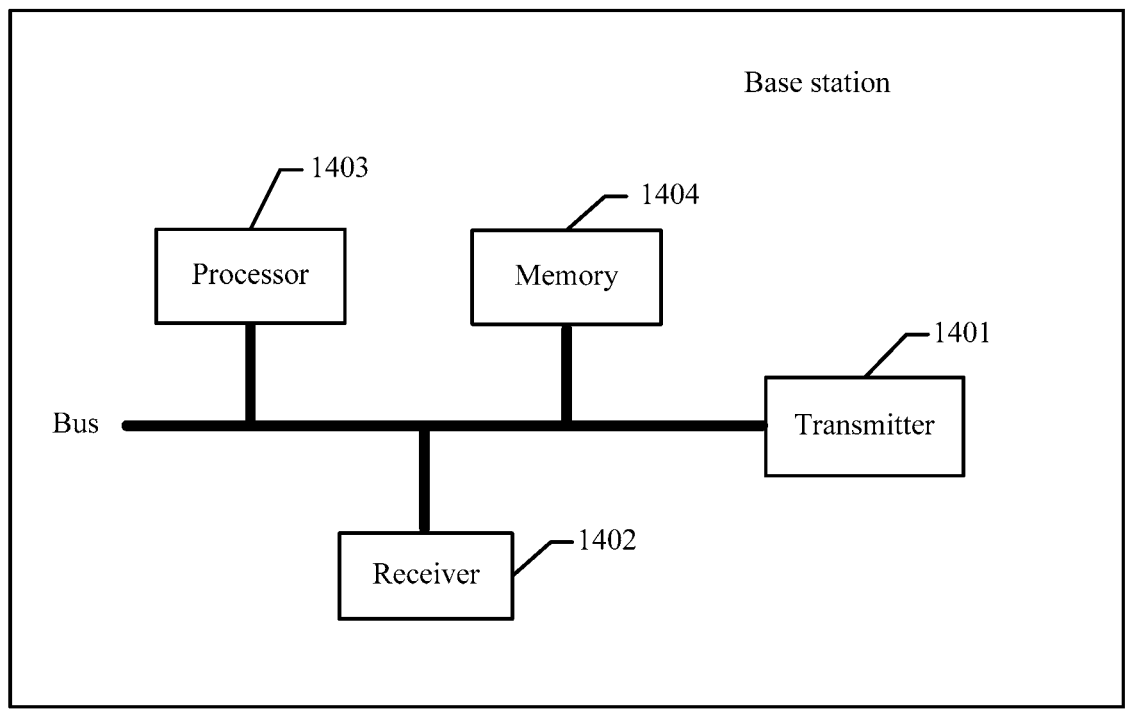
FIG. 14 is another schematic structural diagram of a base station according to an embodiment of the present invention.

As shown in FIG. 14, the base station includes a transmitter 1401, a receiver 1402, a processor 1403, and a memory 1404. There may be one or more processors 1403. In this embodiment, one processor 1403 is used as an example for description.

In this embodiment, the transmitter 1401, the receiver 1402, the memory 1404, and the processor 1403 are connected by using a bus. Certainly, another connection manner may also be used. A specific connection manner is not limited in this embodiment.

The base station in this embodiment of the present invention may include more or fewer components than those shown in FIG. 14, two or more components may be combined, or configurations or settings of the components may be different, and the components may be implemented in hardware, software, or a combination of hardware or software that includes one or more signal-processing and/or application-specific integrated circuits.

The transmitter 1401 is configured to indicate a type of a measurement process to user equipment, where the type of the measurement process is used to enable the user equipment to determine, according to the type of the measurement process, a measurement procedure and a type of fed-back channel state information CSI, the type of the measurement process includes a definition of a signal measurement pilot and a definition of an interference measurement pilot, and different types of measurement processes correspond to different measurement procedures and/or different types of fed-back channel state information CSI.

The receiver 1402 is configured to receive a feedback sent by the user equipment, where
the feedback is generated by the user equipment according to the determined measurement procedure and/or fed-back CSI.

Optionally, the receiver 1402 is configured to: if the signal measurement pilot defined in the measurement process is a first measurement pilot, receive, by the base station, CSI that is sent by the user equipment and whose type is first CSI.

Alternatively, the receiver 1402 is configured to: if the signal measurement pilot defined in the measurement process is a second measurement pilot, receive CSI that is sent by the user equipment and whose type is second CSI, where a feedback amount included in the first CSI and a feedback amount included in the second CSI are different.

Optionally, the processor 1403 determines that the first measurement pilot is a non-precoded pilot or a precoded pilot, and/or the first measurement pilot is a periodically sent pilot.

The processor 1403 determines that the second measurement pilot is a precoded pilot, and/or the second measurement pilot is not sent periodically, and/or the second measurement pilot is triggered by the base station, and/or the second measurement pilot is sent in a subband.

Optionally, the processor 1403 determines that the first CSI includes a rank indication RI, a precoding matrix indication PMI, and a channel quality indication CQI, or the first CSI includes an RI and a PMI; and the second CSI includes an RI, a PMI, and a CQI, or the second CSI includes a CQI, or the second CSI includes an index BI that indicates a selected beam, an RI, and a CQI.

Optionally, the processor 1403 determines that one measurement process includes M signal measurement pilots and K interference measurement pilots, where M is an integer greater than or equal to 1, K is an integer greater than 1, the K interference measurement pilots use independent configurations of limitative measurement, and the limitative measurement is to limit a moving average range of resources that are allowed to be measured.

Optionally, the processor 1403 determines that one measurement process includes M signal measurement pilots and K interference measurement pilots, where M is an integer greater than 1, K is an integer greater than or equal to 1, the M signal measurement pilots use independent configurations of limitative measurement, and the limitative measurement is to limit a moving average range of resources that are allowed to be measured.

Optionally, the processor 1403 determines that the independent configurations of the limitative measurement include at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement.

Optionally, the receiver 1402 receives a CQI sent by the user equipment, where the CQI is one CQI determined by the user equipment by performing synthesis according to measurement amounts of K1 interferences of K interferences that are measured according to the K interference measurement pilots, where K1 is an integer greater than 1 and less than or equal to K.

Optionally, the receiver 1402 receives a CQI sent by the user equipment, where the CQI is one CQI determined by the user equipment by performing synthesis according to M1 signals in measurement of M signals that are measured according to the M signal measurement pilots, where M1 is an integer greater than 1 and less than or equal to M.

Optionally, the processor 1403 determines that the independent configurations of the signaling types of the limitative measurement include that the limitative measurement is configured independently by using higher layer signaling or dynamic signaling, where the dynamic signaling is notified by using UL grant signaling or DL grant signaling.

Optionally, the processor 1403 determines that the K interference measurement pilots are all non-zero power pilots or are all zero power pilots, or the K interference measurement pilots include a non-zero power pilot and a zero power pilot.

Optionally, the processor 1403 determines that at least one of the K interference measurement pilots is configured in such a way that limitative measurement for performing interference measurement is disabled.

Optionally, the processor 1403 determines that pilots of N ports are configured in the measurement process, where pilots of N1 ports are used to measure a signal, and the pilots of all the N ports are used to measure an interference.

Optionally, the processor 1403 determines that one measurement pilot including N ports is configured in the measurement process, where a pilot of one port is used to measure a signal, a pilot of a target port is used to measure an interference, the measurement pilot of the N ports includes the pilot that is of one port and that is used to measure a signal and the pilot of the target port, and the user equipment is configured to perform measurement according to the measurement pilot of the N ports to obtain N CQIs.

Optionally, the processor 1403 determines that one measurement pilot including N ports is configured in the measurement process, where pilots of N1 ports are used to measure a signal, pilots of (NN1) ports are used to measure an interference, N is an integer greater than 1, and N1 is an integer greater than or equal to 1 and less than or equal to N.

Optionally, the processor 1403 determines that a ratio X of a signal measurement power of each pilot port to a power of data is equal to a ratio Y of an interference measurement power of each pilot port to a power of an interference of data received by the user equipment.

Optionally, the processor 1403 determines that a time-frequency resource location of the second measurement pilot is in a first slot of a subframe.

Optionally, the receiver 1402 receives, in a second slot of the subframe at which the second measurement pilot is located, a feedback of the second CSI sent by the user equipment.

Optionally, the processor 1403 determines that the base station determines a time interval X1, where X1 is a time interval from a reference resource of the second CSI that is obtained by measurement by the user equipment according to the second measurement pilot to a reporting moment.

The base station determines a time interval X2, where X2 is a time interval from a reference resource of the first CSI that is obtained by measurement by the user equipment according to the first measurement pilot to a reporting moment.

X1<X2, and the reference resource is a subframe used to send the second measurement pilot.

Optionally, the processor 1403 determines a time interval X1, where X1 is a time interval from a reference resource of the second CSI that is obtained by measurement by the user equipment according to the second measurement pilot to a reporting moment, X1 is configured by using higher layer signaling or is configured by using dynamic signaling, and the reference resource is a subframe used to send the second measurement pilot.

Optionally, the processor 1403 determines a time interval X1, where X1 is a time interval from a reference resource of the second CSI that is obtained by measurement by the user equipment according to the second measurement pilot to a reporting moment, X1 is related to a quantity of resources of the second measurement pilot that are included in one measurement procedure and/or a quantity of ports included in each second measurement pilot, and the reference resource is a subframe used to send the second measurement pilot.

Still another process of a data transmission method provided in this embodiment is described below with reference to FIG. 15.

Step 1501: A base station indicates, to user equipment, N1 reference signal resources in a set that includes N reference signal resources and N2 reference signal resources in the set that includes the N reference signal resources.

In this embodiment, the set that includes the N reference signal resources includes time-frequency resources, and the set that includes the N reference signal resources is used by the user equipment to perform measurement and feedback of channel state information CSI according to the set that includes the N reference signal resources.

Specifically, in this embodiment, the N1 reference signal resources in the set of the N reference signal resources are used to perform channel measurement, and the N2 reference signal resources in the set that includes the N reference signal resources are used to perform interference measurement. The channel state information CSI is determined according to the channel measurement and the interference measurement.

N is a positive integer greater than or equal to 2, N1 is a positive integer less than or equal to N, and N2 is a positive integer less than or equal to N.

In this embodiment, the N1 reference signal resources in the set that includes the N reference signal resources and the N2 reference signal resources in the set that includes the N reference signal resources have an overlapping resource.

Optionally, in this embodiment, the N1 reference signal resources in the set that includes the N reference signal resources are a proper subset of the N2 reference signal resources in the set that includes the N reference signal resources, or the N1 reference signal resources in the set that includes the N reference signal resources and the N2 reference signal resources in the set that includes the N reference signal resources overlap completely.

Specifically, the N1 reference signal resources are used to perform channel information measurement, and the N2 reference signal resources are used to perform interference information measurement.

The channel measurement is that the user equipment performs channel estimation in a non-zero power reference signal resource to obtain information about a signal sent by the base station to the user equipment.

In this embodiment, the N2 reference signal resources that are used to measure an interference and that are in the set that includes the N reference signal resources specifically include N21 reference signal resources configured to have a non-zero power and/or N22 reference signal resources configured to have a zero power.

N21 is less than or equal to N, and N22 is less than or equal to N.

The user equipment can perform interference measurement according to the N21 non-zero power reference signal resources included in the N2 reference signal resources and by using a first interference measurement method, to obtain a first interference. The user equipment can further perform interference measurement by using the N22 zero power reference signal resources included in the N2 reference signal resources and by using a second interference measurement method, to obtain a second interference, and combine the first interference and the second interference to obtain a total interference.

The first interference measurement method is to measure an interference in a non-zero power reference signal resource. It is assumed that a total signal received in the non-zero power reference signal resource is a sum of a signal sent by the base station to the user equipment and an interference. The user equipment performs channel estimation in the non-zero power reference signal resource to obtain the signal sent by the base station to the user equipment, and obtains the interference in a manner of separating, from the total signal, the signal sent by the base station to the user equipment. The interference is the first interference.

The second interference measurement method is to measure an interference in a zero power reference signal resource. It is assumed that the signal received in the zero power reference signal resource is an interference received by the user equipment. The interference is the second interference.

The first interference and the second interference are combined to obtain the total interference.

The channel state information CSI is determined according to the foregoing channel measurement and measurement of the total interference. The channel state information CSI includes at least one of an RI, a PMI, a CQI, an interference covariance matrix, a channel covariance matrix, or a channel feature vector. How the base station shown in this embodiment specifically indicates, to the user equipment, the N1 reference signal resources in the set that includes the N reference signal resources and the N2 reference signal resources in the set that includes the N reference signal resources is described below.

It should be noted that the description of a specific indication process in this embodiment is an optional example, and does not constitute a limitation, as long as the user equipment can determine the N1 reference signal resources in the set that includes the N reference signal resources and the N2 reference signal resources in the set that includes the N reference signal resources.

In a method:

When the user equipment determines locations of time-frequency resources of the N1 reference signal resources in the set that includes the N reference signal resources and locations of time-frequency resources of the N2 reference signal resources in the set that includes the N reference signal resources, the user equipment may determine a location of a time-frequency resource of a non-zero power reference signal resource and a location of a time-frequency resource of a zero power reference signal resource in the set that includes the N reference signal resources.

How the user equipment determines the location of the time-frequency resource of the non-zero power reference signal resource is described below.

The base station sends, to the user equipment, configuration information of the N1 reference signal resources in the set that includes the N reference signal resources.

Specifically, a method for sending the configuration information may be that the base station sends the configuration information by using higher layer signaling or dynamic signaling.

More specifically, the configuration information includes location information of the time-frequency resources of the N1 reference signal resources in the set of the N reference signal resources.

The configuration information further includes at least one of the following:

power information of the N1 reference signal resources in the set of the N reference signal resources, or code resource information of the N1 reference signal resources in the set of the N reference signal resources, where the power information of the reference signal resources includes a relative relationship between a transmit power or data of a reference signal and a reference signal resource power.

It should be noted that specific information included in the configuration information in this embodiment is an optional example, and does not constitute a limitation.

The user equipment receives the configuration information that is sent by the base station and that is used to indicate the N1 reference signal resources in the set that includes the N reference signal resources.

The user equipment may determine, according to the configuration information, the locations of the time-frequency resources of the N1 reference signal resources in the set that includes the N reference signal resources.

Specifically, the base station may allocate at least one port to the user equipment. A manner in which the user equipment specifically determines ports that are used to receive the non-zero power reference signal is described below.

The user equipment receives configuration information sent by the base station. The configuration information is used to indicate that M1 ports of the X1 ports are configured to send a first reference signal used to perform channel measurement, the first reference signal is a non-zero power reference signal, and M1 is less than or equal to X1.

Specifically, X1 is a maximum quantity of ports that are multiplexed at the locations of the time-frequency resources of the N1 reference signal resources.

As can be seen, the user equipment shown in this embodiment may be configured to determine, according to the configuration information, that the M1 ports of the X1 ports are ports that are configured to receive the first reference signal, so that the user equipment receives the first reference signal by using the M1 ports of the X1 ports, and the user equipment performs channel measurement according to the first reference signal that is obtained by using the M1 ports of the X1 ports.

More specifically, the configuration information includes first indication information and second indication information, the first indication information is information that is obtained by the user equipment by using higher layer signaling, the first indication information is used to indicate the X1 ports multiplexed for the N1 reference signal resources in the set of the N reference signal resources, the second indication information is information obtained by the user equipment by using dynamic signaling, and the second indication information is used to indicate the M1 ports of the X1 ports multiplexed for the N1 reference signal resources in the set of the N reference signal resources.

More specifically, the multiplexing of the X1 ports for the N1 reference signal resources in the set that includes the N reference signal resources is code division multiplexing.

Figure 17:
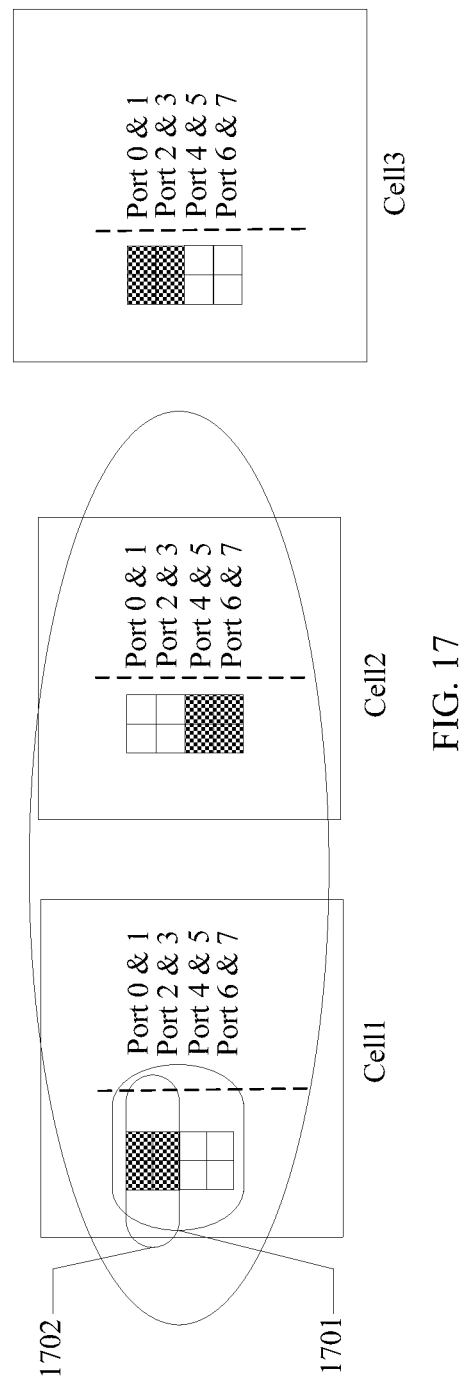
FIG. 17 is a schematic diagram of another embodiment of a data transmission scenario according to an embodiment of the present invention.

Alternatively, the multiplexing of the X1 ports for the N1 reference signal resources in the set that includes the N reference signal resources is time-frequency multiplexing and code division multiplexing. Referring to FIG. 17, 1701 represents one PRB pair, and each box represents an RE. For example, the N1 reference signal resources correspond to 1702. Corresponding X1 ports are a port 0, a port 1, a port 2, and a port 3. The port 0 occupies two REs, and the port 1 occupies two REs. Code division multiplexing, for example, (1, 1) and (1, −1), is performed between the port 0 and the port 1. The port 2 occupies two REs, and the port 3 occupies two REs. Code division multiplexing, for example, (1, 1) and (1, −1), is also performed between the port 2 and the port 3. Frequency division multiplexing is performed between the port 0/1 and the port 2/3.

How the user equipment determines the location of the time-frequency resource of the zero power reference signal resource is described below.

The base station sends, to the user equipment, configuration information used to indicate the N2 reference signal resources in the set that includes the N reference signal resources.

Specifically, a specific manner in which the base station sends, to the user equipment, the configuration information may be that the base station sends the configuration information by using higher layer signaling or the base station sends the configuration information by using dynamic signaling.

More specifically, the configuration information includes location information of the time-frequency resources of the N2 reference signal resources.

The configuration information further includes at least one of the following:

power information of the N2 reference signal resources, or code resource information of the N2 reference signal resources, where the power information of the reference signal resources includes a relative relationship between a transmit power or data of a reference signal and a reference signal resource power.

The user equipment receives the configuration information sent by the base station, so that the user equipment obtains, according to the configuration information, the location information of the time-frequency resources of the N2 reference signal resources.

Figure 16:
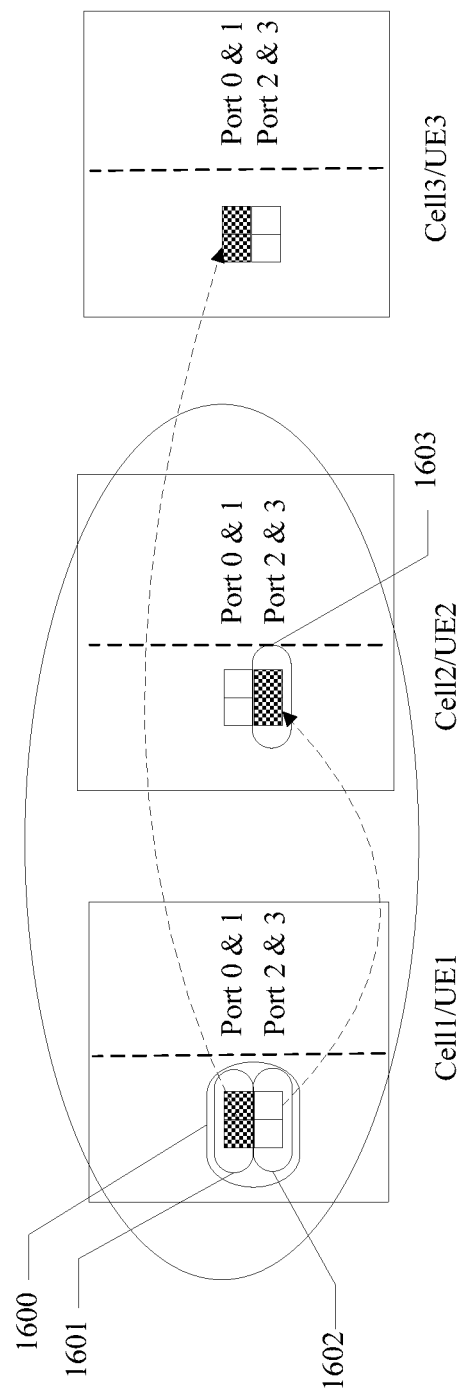
FIG. 16 is a schematic diagram of another embodiment of a data transmission scenario according to an embodiment of the present invention.

An example shown in FIG. 16 is used. It should be noted that FIG. 16 shows only an optional example, and does not constitute a limitation.

As shown in FIG. 16, an example in which the user equipment is user equipment of cell1 is used. The user equipment can determine the locations 1601 of the time-frequency resources of the N1 reference signal resources in the set that includes the N reference signal resources. For a specific determining manner, refer to the foregoing description. Details are not described herein.

The locations 1601 of the time-frequency resources of the N1 reference signal resources in the set that includes the N reference signal resources are locations of time-frequency resources of non-zero power reference signal resources in the set of the N reference signal resources.

The user equipment can further determine the locations 1600 of the time-frequency resources of the N2 reference signal resources in the set that includes the N reference signal resources. In this case, the user equipment may determine that a location of a time-frequency resource in the locations 1600 of the time-frequency resources of the N2 reference signal resources in the set that includes the N reference signal resources other than the locations 1601 of the time-frequency resources of the N1 reference signal resources in the set that includes the N reference signal resources is a location 1602 of a time-frequency resource of a zero power reference signal resource.

In this embodiment, X1 ports may be multiplexed for the N1 reference signal resources in the set that includes the N reference signal resources.

In this embodiment, the X1 ports may be multiplexed for the N1 reference signal resources in the set that includes the N reference signal resources. In this embodiment, a specific quantity of the X1 ports is not limited. The example shown in FIG. 16 is used. The set that includes the N reference signal resources includes four resource elements REs. Two ports, for example, the port 0 and the port 1, may be multiplexed for the N1 reference signal resources in the set that includes the N reference signal resources. The port 0 and the port 1 use two same resource elements REs, and a code division multiplexing manner is used. For example, the port 0 uses an OCC code (1, 1), and the port 1 uses an OCC code (1, −1).

Specifically, in this embodiment, the multiplexing of the X1 ports for the N1 reference signal resources in the set that includes the N reference signal resources is code division multiplexing, or the multiplexing of the X1 ports for the N1 reference signal resources in the set that includes the N reference signal resources is time-frequency multiplexing and code division multiplexing.

It should be noted that in this embodiment, a specific process in which the base station indicates, to the user equipment, the locations of the time-frequency resources of the N1 reference signal resources in the set that includes the N reference signal resources is an optional example, and does not constitute a limitation, as long as the base station can notify the user equipment of the locations that are indicated by the user equipment and that are of the time-frequency resources of the N1 reference signal resources in the set that includes the N reference signal resources.

The example shown in FIG. 16 is used. An example in which the user equipment is the user equipment of cell1 is used. The base station may indicate, to the user equipment, reference signal resources corresponding to the port 2 and the port 3, so that the user equipment can assume that the reference signal resources corresponding to the port 2 and the port 3 are zero-power reference signals to perform interference measurement.

An example shown in FIG. 17 is used. The example in which the user equipment is the user equipment of cell1 is used. The base station may allocate a port 4 to a port 7 to the user equipment, so that the user equipment can receive, by using the port 4 to the port 7, a zero power reference signal sent by the base station. The base station may allocate the port 0 to the port 3 to the user equipment, so that the user equipment can receive, by using the port 0 to the port 3, a non-zero power reference signal sent by the base station.

In another method:

The base station indicates, to the user equipment, locations of time-frequency resources of the set that includes the N reference signal resources.

The base station indicates, to the user equipment, the locations of the time-frequency resources of the N1 reference signal resources in the set that includes the N reference signal resources.

After the user equipment determines the locations of the time-frequency resources of the set that includes the N reference signal resources and the locations of the time-frequency resources of the N1 reference signal resources in the set that includes the N reference signal resources, the user equipment may determine a location of a time-frequency resource of a non-zero power reference signal resource and a location of a time-frequency resource of a zero power reference signal resource in the set that includes the N reference signal resources.

The example shown in FIG. 16 is used. The example in which the user equipment is the user equipment of cell1 is used. The user equipment can determine the locations 1600 of the time-frequency resources of the set that includes the N reference signal resources.

The user equipment can further determine the locations 1601 of the time-frequency resources of the N1 reference signal resources in the set that includes the N reference signal resources, that is, the user equipment determines a location of a time-frequency resource of a non-zero power reference signal resource in the set of the N reference signal resources.

The location of the time-frequency resource of the zero power reference signal resource is a location of a time-frequency resource in the locations 1600 of the time-frequency resources of the set that includes the N reference signal resources other than the locations 1601 of the time-frequency resources of the N1 reference signal resources in the set that includes the N reference signal resources, that is, the location of the time-frequency resource of the zero power reference signal resource.

In this embodiment, for details of that the base station indicates, to the user equipment, the locations of the time-frequency resources of the N1 reference signal resources in the set that includes the N reference signal resources, refer to the foregoing embodiments. Details are not described in this embodiment again.

That the base station indicates, to the user equipment, the locations of the time-frequency resources of the set that includes the N reference signal resources is described below in detail.

Optionally, the user equipment determines configuration information of the set that includes the N reference signal resources according to prestored indication information, where the indication information is agreed upon in advance by the base station and the user equipment, and the indication information is used to indicate the configuration information of the set that includes the N reference signal resources.

The base station and the user equipment may agree beforehand on the locations of the time-frequency resources of the set that includes the N reference signal resources. After the beforehand agreement, the user equipment may store indication information, and the indication information is used to indicate the locations of the time-frequency resources of the set that includes the N reference signal resources.

When the user equipment needs to determine the locations of the time-frequency resources of the set that includes the N reference signal resources, the user equipment may directly retrieve the stored indication information. The user equipment may determine, according to the indication information, the locations of the time-frequency resources of the set that includes the N reference signal resources.

Optionally, the user equipment receives higher layer signaling that is sent by the base station and that is used to indicate a configuration of the set that includes the N reference signal resources.

Optionally, the user equipment receives dynamic signaling that is sent by the base station and that is used to indicate a configuration and information of the set that includes the N reference signal resources.

Specifically, the configuration information includes third indication information and fourth indication information.

The third indication information is information that is obtained by the user equipment by using higher layer signaling.

The third indication information includes the location information of the time-frequency resources of the set of the N reference signal resources.

The third indication information further includes at least one of the following: power information of the set of the N reference signal resources, or code resource information of the set of the N reference signal resources.

The fourth indication information is used to indicate a target port in a range of the time-frequency resources that are of the set of the N reference signal resources and that are indicated by the third indication information. The target port is the M1 ports of the X1 ports multiplexed for the N1 reference signal resources in the set of the N reference signal resources.

The third indication information is higher layer signaling, and the fourth information is dynamic signaling.

In a process in which the base station indicates the target port to the user equipment, the base station designates the target port in a range of the location information that is indicated by the third indication information and that is of the time-frequency resources of the set that includes the N reference signal resources, so that overheads for indicating the target port are reduced and efficiency of data transmission is improved.

In this embodiment, the user equipment determines, according to the location information of the time-frequency resources of the set that includes the N reference signal resources and the location information of the time-frequency resources of the N1 reference signal resources in the set that includes the N reference signal resources, the locations of the time-frequency resources of the N2 reference signal resources in the set that includes the N reference signal resources.

Specifically, the X1 ports are multiplexed for the N1 reference signal resources in the set that includes the N reference signal resources, and the M1 ports of the X1 ports are configured to send a non-zero power reference signal used to perform channel measurement, where M1 is less than or equal to X1.

The user equipment determines, according to the locations of the time-frequency resources of the set that includes the N reference signal resources and the M1 ports of the X1 ports, the locations of the time-frequency resources of the N2 reference signal resources in the set that includes the N reference signal resources.

As can be seen, by means of the method shown in this embodiment, the base station does not need to indicate, to the user equipment, the locations of the time-frequency resources of the N2 reference signal resources in the set that includes the N reference signal resources. The user equipment only needs to determine, according to the locations of the time-frequency resources of the set that includes the N reference signal resources and the locations of the time-frequency resources of the N1 reference signal resources in the set that includes the N reference signal resources, the locations of the time-frequency resources of the N2 reference signal resources in the set that includes the N reference signal resources. The locations of the time-frequency resources of the N2 reference signal resources in the set that includes the N reference signal resources include time-frequency resources corresponding to the X1 non-zero power reference signal ports and resources in the set of the N reference signal resources other than the time-frequency resources corresponding to the X1 non-zero power reference signal ports, and reference signal resources in the set of the N reference signal resources other than the time-frequency resources corresponding to the X1 non-zero power reference signal ports are zero power reference signal resources.

Step 1502: The user equipment receives a signal by using the N2 reference signal resources in the set that includes the N reference signal resources.

In this embodiment, for the signal received by the user equipment by using the N2 reference signal resources in the set that includes the N reference signal resources, refer to the foregoing description of the second measurement pilot for details. Details of the second measurement pilot are not described in this embodiment again.

Specifically, by means of step 1501, the user equipment determines a location of a time-frequency resource of a zero power reference signal resource and a location of a time-frequency resource of a non-zero power reference signal resource in the set that includes the N reference signal resources.

The user equipment may receive a first reference signal by using a non-zero power reference signal resource in the set that includes the N reference signal resources. The first reference signal is a non-zero power reference signal.

Specifically, the first reference signal resource is non-zero power reference signal resources corresponding to the M1 ports of the X1 ports of the user equipment.

The user equipment may receive a second reference signal by using a zero power reference signal resource in the set that includes the N reference signal resources.

Specifically, the second reference signal is a zero power reference signal assumed by the user equipment.

The second reference signal resource is a corresponding time-frequency resource in the time-frequency resources corresponding to the set that includes the N reference signal resources of the user equipment other than the non-zero power reference signal resources corresponding to the M1 ports.

The example shown in FIG. 16 is still used. When the base station determines the set that includes the N reference signal resources, reference signal resources configured for cells or user equipments are cooperatively processed.

Specifically, if in a set that is configured by the base station for a serving user of a cell and that includes N reference signal resources, the non-zero power reference signal resource is 1601, and the zero power reference signal resource is 1602, when the base station performs resource configuration for another cell, as shown in FIG. 16, in a process in which the base station configures a resource for cell2, because cell1 and cell2 have a relationship of a strong interference, the non-zero power reference signal resource 1601 configured for the serving user equipment of cell1 and the non-zero power reference signal resource 1603 configured for a serving user of cell2 are staggered from each other.

More specifically, as shown in FIG. 16, in a process of configuring a reference signal resource for the serving user of cell2, because cell1 and cell3 have a relationship of a weak interference, due to a relatively long distance of sending a signal, cell3 is not to be shunned, that is, cell3 is not to be not shunned. It is assumed that cell1, cell2, and cell3 shown in the figure are in a same time-frequency resource block, and the N reference signal resources occupy a same time-frequency resource location. This is not limited to different cells, and a reference signal resource may be flexibly configured for different users in a same cell, for example, UE1, UE2, and UE3 in a same cell.

The base station can align a time-frequency resource of the first reference signal resource that is used to measure a channel and that is of a weak interference cell cell3 with a time-frequency resource of the first reference signal resource that is used to measure a channel and that is of cell1, so as to implement effective flexible adjustment of overheads and channel measurement precision.

By using a resource configuration manner of the base station shown in this embodiment, the user equipment can accurately estimate a channel, so that the user equipment feeds back accurate CSI to the base station.

Optionally, the user equipment shown in this embodiment may perform dynamic switching among a first interference measurement resource, a second interference measurement resource, and a third interference measurement resource.

The first interference measurement resource is exclusively a non-zero power reference signal resource, a quantity of the non-zero power reference signal resources is N21, and N21 is equal to N.

The second interference measurement resource is exclusively a zero power reference signal resource, a quantity of the zero power reference signal resources is N22, and N22 is equal to N.

The third interference measurement resource includes non-zero power reference signal resources and zero power reference signal resources, a quantity of the non-zero power reference signal resources is N21, N21 is less than N, a quantity of the zero power reference signal resources is N22, and N22 is less than N.

A beneficial effect of implementing the dynamic switching by the user equipment shown in this embodiment is as follows:

Because the user equipment can perform dynamic switching among the first interference measurement resource, the second interference measurement resource, and the third interference measurement resource, a system may perform flexible adjustment of accuracy of interference measurement and overheads of reference signal measurement.

If the user equipment uses the first interference measurement resource to perform interference measurement, although overheads are reduced, an interference is relatively strong. Consequently, accuracy of measurement is reduced.

If the user equipment uses the second interference measurement resource to perform interference measurement, although overheads are increased, an interference is relatively weak. Consequently, a result of measurement is more accurate.

In a specific application, the user equipment may perform, according to a requirement, dynamic switching to the third interference measurement resource between the first interference measurement resource and the second interference measurement resource, so as to ensure relatively low overheads and a relatively weak interference, and ensure an accurate measurement result.

Step 1503: The user equipment performs channel measurement on a signal received in the non-zero power resource, to obtain channel information.

The signal R1 received by the user equipment in the non-zero power resource equals $S+2I_1+\sigma^2$.

S is a signal obtained by signal estimation and measurement by a user UE1 of a cell cell1, that is, S is a signal that is sent by the base station to the user equipment, a measured interference is $2I_1+\sigma^2$, and $\sigma^2$ is a noise.

Specifically, S=H1*X1 where H1 represents a channel from the base station to the user equipment, X1 represents a reference signal from the base station to the user equipment, and H1 is obtained by channel estimation.

In this embodiment, to facilitate calculation of a signal-to-noise ratio by the user equipment, and to further enable the user equipment to feed back CSI to the base station, a ratio of a reference signal power of a non-zero power reference signal sent by the base station to the user equipment by using the non-zero power reference signal resource to a power of each layer of data transmitted by the base station is M, and M may be determined by using N and N1.

The example shown in FIG. 16 is used. Because the cell cell1 sends two-layer data to the UE, that is, M=2, a ratio of a reference signal power of a first reference signal resource sent by the base station to the user equipment by using the non-zero power reference signal resource to a power of each layer of data transmitted by the base station is 2, that is, 3 dB.

In this embodiment, an example in which UE1 receives the first reference signal resource by using the port 1 is used. In this embodiment, $I_1$ in $2I_1$ is an assumed interference from an interfering user of cell3, and it is assumed that a ratio of a non-zero power reference signal power of the interfering user to a power of each layer of data of the interfering user is 2. Therefore, a measured interference is $2I_1$.

Further, refer to the example shown in FIG. 16. An interference $I_1$ to the user equipment UE1 is a weak interference of UE3 in cell3.

Step 1504: The user equipment performs measurement according to the signal received in the zero power resource, to obtain interference information.

Specifically, the example shown in FIG. 16 is used. Cell1 is used as an example. An example in which the user equipment is a user of cell1 is used, and an example in which the cell cell1 sends two-layer data is used.

It should be noted that, in this embodiment, a quantity of layers of data sent by a cell is not limited.

A second reference signal resource R2 received by the user equipment equals $2I_1+\sigma^2$.

An interference and a noise that are measured by the user equipment according to the second reference signal resource equals $2I_1+\sigma^2$, and $\sigma^2$ is the noise. It is assumed that the interference is from an interfering user of cell2, and it is assumed that a ratio of the non-zero power reference signal power of the interfering user to a power of each layer of data of the interfering user is 2. Therefore, a measured interference is $2I_2$.

In this embodiment, to facilitate calculation of a signal-to-noise ratio by the user equipment, and to further enable the user equipment to feed back CSI to the base station, a ratio of a reference signal power of the second reference signal resource sent by the base station to the user equipment by using the zero power reference signal resource to a power of each layer of data transmitted by the base station is N, and N is a quantity of layers of data transmitted by the base station.

The example shown in FIG. 16 is used. Because the cell cell1 sends two-layer data, that is, N=2, the ratio of the reference signal power of the second reference signal resource sent by the base station to the user equipment by using the zero power reference signal resource to a power of each layer of data transmitted by the base station is 2, that is, 3 dB.

In this embodiment, an example in which the UE1 receives the second reference signal resource by using a port 2 and a port 3 is used. In this embodiment, $I_2$ in $2I_2$ is an assumed interference of an interfering user, and a ratio of the non-zero power reference signal power of the data of the interfering user to a power of each layer of data corresponding to the interfering user is 2. Therefore, a measured interference is $2I_2$.

Step 1505: The user equipment determines channel state information CSI according to the channel information and the interference information.

Optionally, the channel state information CSI shown in this embodiment is a signal-to-noise ratio.

A specific process of calculating a signal-to-noise ratio by the user equipment may be as follows:

In this embodiment, SINR=S/(I+$\sigma^2$), I is a total interference, and I=$I_1$+$I_2$.

In step 1503, the user equipment can calculate $I_1$ according to R1=S+2$I_1$+$\sigma^2$.

In step 1504, the user equipment can calculate $I_2$ according to R2=2$I_1$+$\sigma^2$.

The user equipment may substitute $I_1$ and $I_2$ into I+$I_1$+$I_2$ to obtain $$I = \frac{R_1 - S + R_2}{2} = \frac{2I_1 + 2I_2 + 2\sigma^2}{2} = I_1 + I_2 + \sigma^2,$$

so as to further substitute the obtained I into SINR=S/(I=$\sigma^2$).

As can be seen, to facilitate calculation of a signal-to-noise ratio by the user equipment, the first reference signal resource and the second reference signal resource sent by the base station to the user equipment have a power difference from data sent by the base station to the user equipment, where the power difference is that the power of the first reference signal resource or the second reference signal resource is twice as large as the power of the data. By using such a processing manner in this embodiment, an accurate interference and noise $I_1$+$I_2$+$\sigma_2$ can be obtained. Otherwise, it is assumed that in the foregoing, the power of the first reference signal resource or the second reference signal resource is not twice as large as the power of the data, I=$I_1$+$I_2$+2$\sigma^2$, and interference measurement is not accurate.

As can be seen, the first reference signal resource and the second reference signal resource are transmitted by using at least two frequency division resources. If the first reference signal resource and the second reference signal resource are transmitted by using N frequency division resources, a ratio of a power of each reference signal port to a power of data is N, where $$I = \frac{NI_1 + NI_2 + N\sigma^2}{N} = I_1 + I_1 + \sigma^2.$$

M may be determined by using a quantity of frequency division resources occupied by the N resources.

Step 1506: The user equipment quantizes the signal-to-noise ratio and feeds back the quantized signal-to-noise ratio to the base station.

It should be noted that, in this embodiment, an example in which the channel state information CSI is a signal-to-noise ratio is used for description. In a specific application, the channel state information CSI may also be a detected first reference signal resource and a detected second reference signal resource. In this case, the user equipment may directly feed back the first reference signal resource and the second reference signal resource to the base station. The base station measures a signal-to-noise ratio according to the received first reference signal resource and second reference signal resource. For a specific process in which the base station measures a signal-to-noise ratio, refer to a measurement process of a signal-to-noise ratio by the user equipment in the foregoing for details. Details are not described in this embodiment again.

Step 1507: The base station receives the signal-to-noise ratio fed back by the user equipment.

Figure 15:
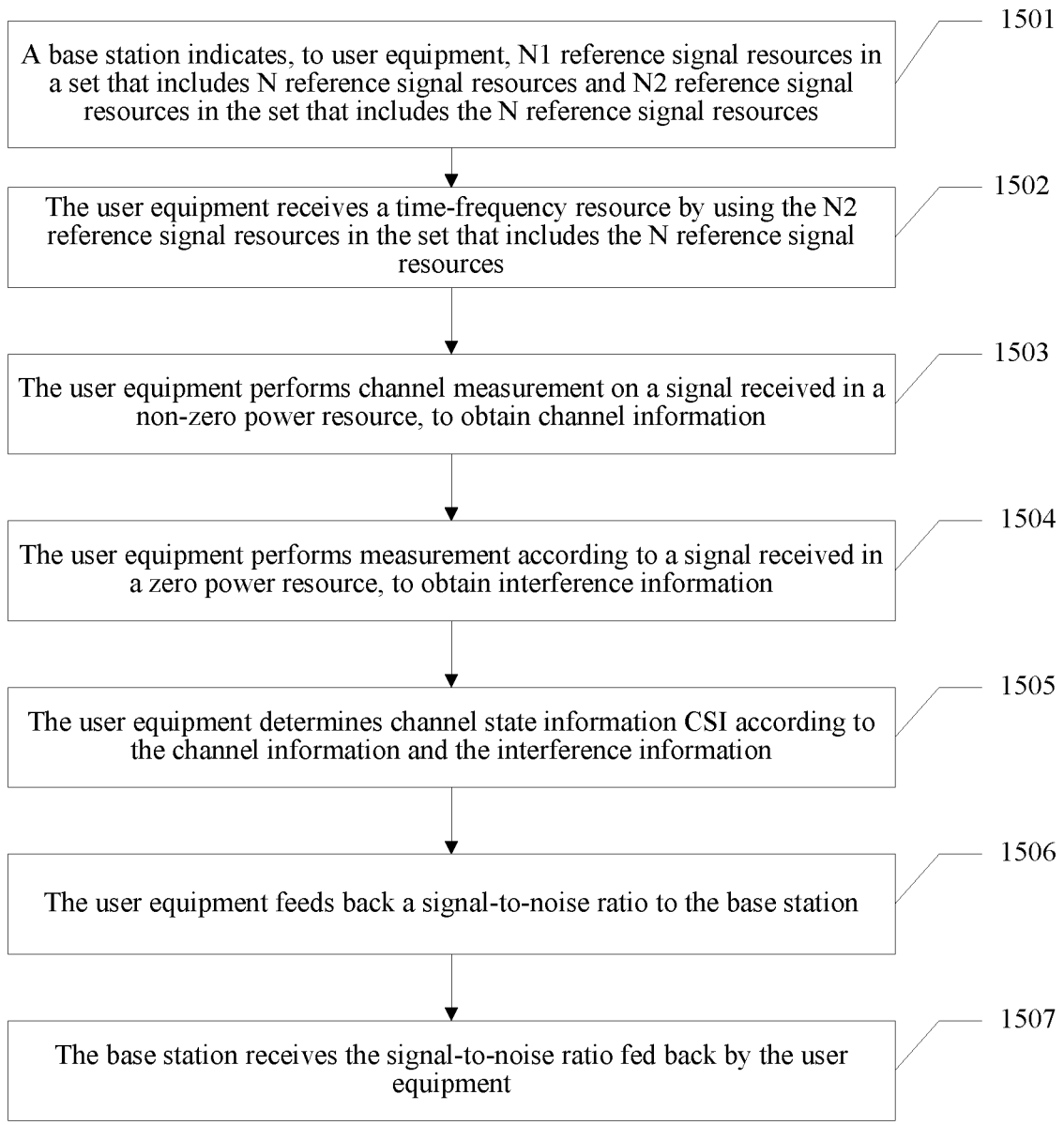
FIG. 15 is a flowchart of steps of another embodiment of a data transmission method according to an embodiment of the present invention.

The specific structures of the base station and the user equipment provided in this embodiment may also be configured to implement the method shown in FIG. 15. Specific functional modules of the base station and the user equipment are not limited in this embodiment, as long as the functional modules can implement the method shown in this embodiment.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
   determining, by user equipment, a measurement process and a type of fed-back channel state information CSI according to a type of a measurement process, wherein the type of the measurement process comprises a definition of a signal measurement pilot and a definition of an interference measurement pilot, and different types of measurement processes correspond to different measurement procedures and/or different types of fed-back channel state information CSI, wherein that different types of measurement processes correspond to different measurement procedures and/or different types of fed-back channel state information CSI comprises:
   one measurement process comprises M signal measurement pilots and K interference measurement pilots, wherein M is an integer greater than or equal to 1, K is an integer greater than 1, and the K interference measurement pilots use independent configurations of limitative measurement, the limitative measurement being configured to limit a moving average range of resources that are allowed to be measured,
   wherein the independent configurations of the limitative measurement comprise at least one of the following:
   independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement; and
   performing, by the user equipment, measurement and feedback according to the determined measurement procedure and/or the determined type of the fed-back CSI.

2. The method according to claim 1, wherein the K interference measurement pilots are all non-zero power pilots or are all zero power pilots, or the K interference measurement pilots comprise a non-zero power pilot and a zero power pilot.

3. A data transmission method, comprising:
   indicating, by a base station, a type of a measurement process to user equipment, wherein the type of the measurement process is used to enable the user equipment to determine, according to the type of the measurement process, a measurement procedure and a type of fed-back channel state information CSI, the type of the measurement process comprises a definition of a signal measurement pilot and a definition of an interference measurement pilot, and different types of measurement processes correspond to different measurement procedures and/or different types of fed-back channel state information CSI, wherein that different types of measurement processes correspond to different measurement procedures and/or different types of fed-back channel state information CSI comprises:
   one measurement process comprises M signal measurement pilots and K interference measurement pilots, wherein M is an integer greater than or equal to 1, K is an integer greater than 1, and the K interference measurement pilots use independent configurations of limitative measurement, the limitative measurement being configured to limit a moving average range of resources that are allowed to be measured, and
   the independent configurations of the limitative measurement comprise at least one of the following:
   independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement; and
   receiving, by the base station, a feedback sent by the user equipment, wherein the feedback is generated by the user equipment according to the determined measurement procedure and/or fed-back CSI.

4. The method according to claim 3, wherein the K interference measurement pilots are all non-zero power pilots or are all zero power pilots, or the K interference measurement pilots comprise a non-zero power pilot and a zero power pilot.

5. User equipment, comprising:
   a processor, configured to determine a measurement procedure and a type of fed-back channel state information CSI according to a type of a measurement process, wherein the type of the measurement process comprises a definition of a signal measurement pilot and a definition of an interference measurement pilot, and different types of measurement processes correspond to different measurement procedures and/or different types of fed-back channel state information CSI,
   wherein the processor is further configured to determine that one measurement process comprises M signal measurement pilots and K interference measurement pilots, wherein M is an integer greater than or equal to 1, K is an integer greater than 1, and the K interference measurement pilots use independent configurations of limitative measurement, the limitative measurement being configured to limit a moving average range of resources that are allowed to be measured, and
   the processor is further configured to determine that the independent configurations of the limitative measurement comprise at least one of the following:
   independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement; and
   a transmitter, configured to perform measurement and feedback according to the determined measurement procedure and/or the determined type of the fed-back CSI.

6. The user equipment according to claim 5, wherein the processor is further configured to determine that the K interference measurement pilots are all non-zero power pilots or are all zero power pilots, or the K interference measurement pilots comprise a non-zero power pilot and a zero power pilot.

7. A base station, comprising:
   a transmitter, configured to indicate a type of a measurement process to user equipment, wherein the type of the measurement process is used to enable the user equipment to determine, according to the type of the measurement process, a measurement procedure and a type of fed-back channel state information CSI, the type of the measurement process comprises a definition of a signal measurement pilot and a definition of an interference measurement pilot, and different types of measurement processes correspond to different measurement procedures and/or different types of fed-back channel state information CSI, the transmitter is further configured to indicate that one measurement process comprises M signal measurement pilots and K interference measurement pilots, wherein M is an integer greater than or equal to 1, K is an integer greater than 1, and the K interference measurement pilots use independent configurations of limitative measurement, the limitative measurement being configured to limit a moving average range of resources that are allowed to be measured, the transmitter is further configured to indicate that the independent configurations of the limitative measurement comprise at least one of the following:

independent enabling and disabling of the limitative measurement, independent configurations of start times of time windows of the limitative measurement, independent configurations of end times of time windows of the limitative measurement, independent configurations of time lengths of average windows of the limitative measurement, or independent configurations of signaling types of the limitative measurement; and a receiver, configured to receive a feedback sent by the user equipment, wherein the feedback is generated by the user equipment according to the determined measurement procedure and/or fed-back CSI.

8. The base station according to claim 7, wherein the transmitter is further configured to indicate that the K interference measurement pilots are all non-zero power pilots or are all zero power pilots, or the K interference measurement pilots comprise a non-zero power pilot and a zero power pilot.

* * * * *